United States Patent
Saylor et al.

(10) Patent No.: US 11,579,470 B2
(45) Date of Patent: Feb. 14, 2023

(54) LENS WITH ANTI-FOG ELEMENT

(71) Applicant: Oakley, Inc., Foothill Ranch, CA (US)

(72) Inventors: Ryan Saylor, Mission Viejo, CA (US); Brock Scott McCabe, Laguna Niguel, CA (US); Carlos D. Reyes, Rancho Santa Margarita, CA (US)

(73) Assignee: Oakley, Inc., Foothill Ranch (CA)

( * ) Notice: Subject to any disclaimer, the term of this patent is extended or adjusted under 35 U.S.C. 154(b) by 331 days.

(21) Appl. No.: 16/896,016

(22) Filed: Jun. 8, 2020

(65) Prior Publication Data

US 2020/0409183 A1 Dec. 31, 2020

Related U.S. Application Data

(63) Continuation of application No. 15/337,573, filed on Oct. 28, 2016, now abandoned, which is a
(Continued)

(51) Int. Cl.
*G02C 7/10* (2006.01)
*G02C 7/08* (2006.01)
(Continued)

(52) U.S. Cl.
CPC ............. *G02C 7/104* (2013.01); *G02B 1/041* (2013.01); *G02B 1/11* (2013.01); *G02C 7/086* (2013.01);
(Continued)

(58) Field of Classification Search
CPC ........ G02C 7/104; G02C 7/086; G02C 7/101; G02C 7/102; G02C 7/108; G02C 7/12;
(Continued)

(56) References Cited

U.S. PATENT DOCUMENTS 2,219,122 A 10/1940 Weidert et al.
3,269,267 A 8/1966 Collins
(Continued)

FOREIGN PATENT DOCUMENTS

CN 1338622 A 3/2002
CN 2859575 Y 1/2007
(Continued)

OTHER PUBLICATIONS

Golz and MacLeod, "Colorimetry for CRT displays," J. Opt. Soci. Am. A, vol. 20, No. 5, May 2003, pp. 769-781.
(Continued)

*Primary Examiner* — Tuyen Tra
(74) *Attorney, Agent, or Firm* — Sterne, Kessler, Goldstein & Fox P.L.L.C.

(57) ABSTRACT

Embodiments disclosed herein include eyewear that has one or more laminates applied to a lens body. In some embodiments, the lens body is constructed from a substantially rigid material having a curved shape. The lens body can have any desired curvature, including, for example, cylindrical, spherical or toroidal. A laminate can include a substantially flexible substrate and one or more functional layers or coatings applied to the substrate. In addition, one or more functional layers or coatings can be applied directly to the lens body. In certain embodiments, a bonding layer bonds a laminate to a convex and/or concave surface of the lens body. Examples of functional layers or coatings that can be applied to a laminate include anti-reflection coatings, interference stacks, hard coatings, flash mirrors, anti-static coatings, anti-fog coatings, other functional layers, or a combination of functional layers.

20 Claims, 10 Drawing Sheets

Related U.S. Application Data continuation of application No. 14/536,214, filed on Nov. 7, 2014, now abandoned, which is a continuation of application No. PCT/US2013/040284, filed on May 9, 2013.

(60) Provisional application No. 61/645,543, filed on May 10, 2012.

(51) Int. Cl.

| | | |
|---|---|---|
| *G02C 7/12* | (2006.01) | |
| *G02B 1/04* | (2006.01) | |
| *G02B 1/11* | (2015.01) | |
| *G02F 1/157* | (2006.01) | |
| *B29D 11/00* | (2006.01) | |

(52) U.S. Cl.
CPC ............ *G02C 7/101* (2013.01); *G02C 7/102* (2013.01); *G02C 7/108* (2013.01); *G02C 7/12* (2013.01); *G02F 1/157* (2013.01); *B29D 11/0073* (2013.01); *G02C 2202/16* (2013.01)

(58) Field of Classification Search
CPC ...... G02C 2202/16; G02B 1/041; G02B 1/11; G02F 1/157; B29D 11/0073
USPC ............... 351/41, 159.01, 159.6, 159.62
See application file for complete search history.

(56) References Cited

U.S. PATENT DOCUMENTS

| | | |
|---|---|---|
| 3,377,626 A | 4/1968 | Smith |
| 3,432,220 A | 3/1969 | Schreiner |
| 3,591,864 A | 7/1971 | Allsop |
| 3,701,590 A | 10/1972 | Zeltzer |
| 3,877,797 A | 4/1975 | Thornton, Jr. |
| 4,168,113 A | 9/1979 | Chang et al. |
| 4,176,299 A | 11/1979 | Thornton, Jr. |
| 4,268,134 A | 5/1981 | Gulati et al. |
| 4,288,250 A | 9/1981 | Yamashita |
| 4,300,819 A | 11/1981 | Taylor |
| 4,354,739 A | 10/1982 | Scanlon et al. |
| 4,376,829 A | 3/1983 | Daiku |
| 4,405,881 A | 9/1983 | Kobayashi |
| 4,521,524 A | 6/1985 | Yamashita |
| 4,537,612 A | 8/1985 | Borrelli et al. |
| 4,571,748 A | 2/1986 | Carroll et al. |
| 4,659,178 A | 4/1987 | Kyogoku |
| 4,663,562 A | 5/1987 | Miller et al. |
| 4,687,926 A | 8/1987 | Plummer |
| 4,765,729 A | 8/1988 | Taniguchi |
| 4,769,347 A | 9/1988 | Cook et al. |
| 4,777,090 A | 10/1988 | Ovshinsky et al. |
| 4,802,755 A | 2/1989 | Hensler |
| 4,826,286 A | 5/1989 | Thornton, Jr. |
| 4,838,673 A | 6/1989 | Richards et al. |
| 4,859,039 A | 8/1989 | Okumura et al. |
| 4,908,996 A | 3/1990 | Friedman et al. |
| 4,998,817 A | 3/1991 | Zeltzer |
| 5,039,631 A | 8/1991 | Krashkevich et al. |
| 5,051,309 A | 9/1991 | Kawaki et al. |
| RE33,729 E | 10/1991 | Perilloux |
| 5,054,902 A | 10/1991 | King |
| 5,061,659 A | 10/1991 | Ciolek et al. |
| 5,073,423 A | 12/1991 | Johnson et al. |
| 5,077,240 A | 12/1991 | Hayden et al. |
| 5,121,030 A | 6/1992 | Schott |
| 5,121,239 A | 6/1992 | Post |
| 5,135,298 A | 8/1992 | Feltman |
| 5,149,183 A | 9/1992 | Perrott et al. |
| 5,164,858 A | 11/1992 | Aguilera, Jr. et al. |
| 5,171,607 A | 12/1992 | Cumbo |
| 5,190,896 A | 3/1993 | Pucilowski et al. |
| 5,198,267 A | 3/1993 | Aharoni et al. |
| 5,218,386 A | 6/1993 | Levien |
| 5,306,746 A | 4/1994 | Ida et al. |
| 5,353,148 A | 10/1994 | Eid et al. |
| 5,364,498 A | 11/1994 | Chen |
| 5,408,278 A | 4/1995 | Christman |
| 5,434,707 A | 7/1995 | Dalzell et al. |
| 5,438,024 A | 8/1995 | Bolton et al. |
| 5,446,007 A | 8/1995 | Krashkevich et al. |
| 5,471,036 A | 11/1995 | Sperbeck |
| 5,513,038 A | 4/1996 | Abe |
| 5,550,599 A | 8/1996 | Jannard |
| 5,574,517 A | 11/1996 | Pang et al. |
| 5,592,245 A | 1/1997 | Moore et al. |
| 5,646,479 A | 7/1997 | Troxell |
| 5,646,781 A | 7/1997 | Johnson, Jr. |
| 5,658,502 A | 8/1997 | Hughes |
| 5,668,618 A | 9/1997 | Simioni |
| 5,694,240 A | 12/1997 | Sternbergh |
| 5,702,813 A | 12/1997 | Murata et al. |
| 5,715,031 A | 2/1998 | Roffman et al. |
| 5,724,187 A | 3/1998 | Varaprasad et al. |
| 5,729,323 A | 3/1998 | Arden et al. |
| 5,731,898 A | 3/1998 | Orzi et al. |
| 5,751,481 A | 5/1998 | Dalzell et al. |
| 5,774,202 A | 6/1998 | Abraham et al. |
| 5,922,246 A | 7/1999 | Matsushita et al. |
| 5,925,438 A | 7/1999 | Ota et al. |
| 5,925,468 A | 7/1999 | Stewart |
| 5,928,718 A | 7/1999 | Dillon |
| 5,995,273 A | 11/1999 | Chandrasekhar |
| 6,040,053 A | 3/2000 | Scholz et al. |
| 6,045,224 A | 4/2000 | Kallenbach et al. |
| 6,102,539 A | 8/2000 | Tucker |
| 6,132,044 A | 10/2000 | Sternbergh |
| 6,135,595 A | 10/2000 | Takeshita et al. |
| 6,138,286 A | 10/2000 | Robrahn et al. |
| 6,142,626 A | 11/2000 | Lu et al. |
| 6,145,984 A | 11/2000 | Farwig |
| 6,166,848 A | 12/2000 | Cammenga et al. |
| 6,168,271 B1 | 1/2001 | Houston et al. |
| 6,175,450 B1 | 1/2001 | Andreani et al. |
| 6,178,034 B1 | 1/2001 | Allemand et al. |
| 6,210,858 B1 | 4/2001 | Yasuda et al. |
| 6,239,778 B1 | 5/2001 | Palffy-Muhoray et al. |
| 6,242,065 B1 | 6/2001 | Blomberg et al. |
| 6,256,152 B1 | 7/2001 | Coldrey et al. |
| 6,312,811 B1 | 11/2001 | Frigoli et al. |
| 6,313,577 B1 | 11/2001 | Kunisada et al. |
| 6,315,411 B1 | 11/2001 | Hatchiguian |
| 6,319,594 B1 | 11/2001 | Suzuki et al. |
| 6,334,680 B1 | 1/2002 | Larson |
| 6,355,124 B1 | 3/2002 | Blomberg et al. |
| 6,367,930 B1 | 4/2002 | Santelices |
| 6,382,788 B1 | 5/2002 | Stehager |
| 6,391,810 B1 | 5/2002 | Lenhart |
| 6,416,867 B1 | 7/2002 | Karpen |
| 6,420,290 B1 | 7/2002 | Brocheton et al. |
| 6,450,652 B1 | 9/2002 | Karpen |
| 6,460,994 B1 | 10/2002 | Nolan |
| 6,480,250 B1 | 11/2002 | Matsufuji et al. |
| 6,489,015 B1 | 12/2002 | Tsuchiya et al. |
| 6,491,851 B1 | 12/2002 | Keller et al. |
| 6,582,823 B1 | 6/2003 | Sakhrani et al. |
| 6,604,824 B2 | 8/2003 | Larson |
| 6,631,987 B2 | 10/2003 | Reichow et al. |
| 6,641,261 B2 | 11/2003 | Wang et al. |
| 6,650,473 B2 | 11/2003 | Nakagoshi |
| 6,659,608 B2 | 12/2003 | Yamamoto et al. |
| RE38,402 E | 1/2004 | Stephens et al. |
| 6,677,260 B2 | 1/2004 | Crane et al. |
| 6,696,140 B2 | 2/2004 | Suzuki |
| 6,733,543 B2 | 5/2004 | Pyles et al. |
| 6,770,352 B2 | 8/2004 | Suzuki et al. |
| 6,770,692 B1 | 8/2004 | Kobayashi et al. |
| 6,773,816 B2 | 8/2004 | Tsutsumi |
| 6,778,240 B2 | 8/2004 | Nakamura et al. |
| RE38,617 E | 10/2004 | Saito et al. |
| 6,801,360 B2 | 10/2004 | Phillips et al. |
| 6,807,006 B2 | 10/2004 | Nakagoshi |

(56) References Cited

U.S. PATENT DOCUMENTS

| | | |
|---|---|---|
| 6,811,258 B1 | 11/2004 | Grant |
| 6,811,727 B2 | 11/2004 | Havens et al. |
| 6,849,327 B1 | 2/2005 | Ikuhara et al. |
| 6,852,657 B2 | 2/2005 | Kolberg et al. |
| 6,854,844 B2 | 2/2005 | Kroll et al. |
| 6,863,397 B2 | 3/2005 | Nakano |
| 6,886,937 B2 | 5/2005 | Moravec et al. |
| 6,893,127 B2 | 5/2005 | Reichow et al. |
| 6,908,647 B2 | 6/2005 | Obayashi et al. |
| 6,908,698 B2 | 6/2005 | Yoshida et al. |
| 6,926,405 B2 | 8/2005 | Ambler et al. |
| 6,932,472 B2 | 8/2005 | Marason et al. |
| 6,955,430 B2 | 10/2005 | Pratt |
| 6,979,083 B2 | 12/2005 | Kerns, Jr. et al. |
| 6,984,038 B2 | 1/2006 | Ishak |
| 6,984,262 B2 | 1/2006 | King et al. |
| 6,995,891 B2 | 2/2006 | Agrawal et al. |
| 7,029,118 B2 | 4/2006 | Ishak |
| 7,035,010 B2 | 4/2006 | Iori et al. |
| 7,036,932 B2 | 5/2006 | Boulineau et al. |
| 7,048,997 B2 | 5/2006 | Bhalakia et al. |
| 7,106,509 B2 | 9/2006 | Sharp |
| 7,212,341 B2 | 5/2007 | Ikeyama |
| 7,226,162 B2 | 6/2007 | Mah |
| 7,229,686 B2 | 6/2007 | Yoshikawa et al. |
| 7,255,435 B2 | 8/2007 | Pratt |
| 7,256,921 B2 | 8/2007 | Kumar et al. |
| 7,276,544 B2 | 10/2007 | Lai et al. |
| 7,277,215 B2 | 10/2007 | Greer |
| 7,278,737 B2 | 10/2007 | Mainster et al. |
| 7,349,138 B2 | 3/2008 | Kumar et al. |
| 7,372,640 B2 | 5/2008 | Fung |
| 7,377,639 B2 | 5/2008 | Boulineau et al. |
| 7,393,100 B2 | 7/2008 | Mertz |
| 7,443,608 B2 | 10/2008 | Dillon |
| 7,506,976 B2 | 3/2009 | Baiocchi et al. |
| 7,506,977 B1 | 3/2009 | Aiiso |
| 7,520,608 B2 | 4/2009 | Ishak et al. |
| 7,537,828 B2 | 5/2009 | Coggio et al. |
| 7,556,376 B2 | 7/2009 | Ishak et al. |
| 7,572,513 B2 | 8/2009 | Kutsukake et al. |
| 7,597,441 B1 | 10/2009 | Farwig |
| 7,604,866 B2 | 10/2009 | Ohashi et al. |
| 7,656,581 B2 | 2/2010 | Giraudet |
| 7,717,557 B2 | 5/2010 | Kobayashi et al. |
| 7,732,006 B2 | 6/2010 | Alberto de Rojas |
| 7,794,831 B2 | 9/2010 | Faris |
| 7,808,692 B2 | 10/2010 | Karmhag et al. |
| 7,842,204 B2 | 11/2010 | Chiu |
| 7,901,074 B2 | 3/2011 | Yamamoto et al. |
| 7,906,047 B2 | 3/2011 | Chen et al. |
| 7,922,324 B2 | 4/2011 | Ishibashi et al. |
| 7,926,940 B2 | 4/2011 | Blum et al. |
| 7,936,496 B2 | 5/2011 | Kosa et al. |
| 7,964,121 B2 | 6/2011 | Hsu |
| 8,004,057 B2 | 8/2011 | Tian et al. |
| 8,012,386 B2 | 9/2011 | Clere |
| 8,029,705 B2 | 10/2011 | Bhalakia et al. |
| 8,057,716 B2 | 11/2011 | Hsu |
| 8,066,371 B2 | 11/2011 | Miyoshi |
| 8,092,726 B2 | 1/2012 | Hsu |
| 8,177,358 B2 | 5/2012 | Matera et al. |
| 8,210,678 B1 | 7/2012 | Farwig |
| 8,292,430 B2 | 10/2012 | Miyoshi |
| 8,367,211 B2 | 2/2013 | Qin et al. |
| 8,398,234 B2 | 3/2013 | Wang et al. |
| 8,562,130 B2 | 10/2013 | Kosa et al. |
| 8,687,261 B2 | 4/2014 | Gillaspie et al. |
| 8,703,296 B2 | 4/2014 | Fujinaka et al. |
| 8,709,582 B2 * | 4/2014 | Zheng ............... G02B 1/18 428/323 |
| 8,733,929 B2 | 5/2014 | Chiou et al. |
| 8,746,879 B2 | 6/2014 | Jiang et al. |
| 8,770,749 B2 | 7/2014 | McCabe et al. |
| 8,911,082 B2 | 12/2014 | Ambler |
| 9,134,547 B2 | 9/2015 | McCabe et al. |
| 9,146,336 B2 | 9/2015 | Matsumoto et al. |
| 9,383,594 B2 | 7/2016 | McCabe et al. |
| 9,575,335 B1 | 2/2017 | McCabe et al. |
| 9,910,297 B1 | 3/2018 | McCabe et al. |
| 10,520,756 B2 | 12/2019 | Gallina et al. |
| 10,571,719 B1 | 2/2020 | McCabe et al. |
| 2001/0005281 A1 | 6/2001 | Yu |
| 2001/0025948 A1 | 10/2001 | Walters et al. |
| 2001/0035935 A1 | 11/2001 | Bhalakia et al. |
| 2002/0034630 A1 | 3/2002 | Cano et al. |
| 2002/0090516 A1 | 7/2002 | Loshak et al. |
| 2002/0135734 A1 | 9/2002 | Reichow et al. |
| 2003/0001991 A1 | 1/2003 | Faris et al. |
| 2003/0020988 A1 | 1/2003 | Stone |
| 2003/0076474 A1 | 4/2003 | Wang et al. |
| 2003/0086159 A1 | 5/2003 | Suzuki et al. |
| 2003/0087087 A1 | 5/2003 | Onozawa et al. |
| 2003/0129422 A1 | 7/2003 | Shirakawa et al. |
| 2004/0005482 A1 | 1/2004 | Kobayashi et al. |
| 2004/0095645 A1 | 5/2004 | Pellicori et al. |
| 2004/0114242 A1 | 6/2004 | Sharp |
| 2004/0229056 A1 | 11/2004 | Hayashi |
| 2004/0246437 A1 | 12/2004 | Ambler et al. |
| 2005/0007548 A1 | 1/2005 | Ishak |
| 2005/0009964 A1 | 1/2005 | Sugimura et al. |
| 2005/0168690 A1 | 8/2005 | Kawai et al. |
| 2005/0175969 A1 | 8/2005 | Hayes |
| 2005/0201585 A1 | 9/2005 | Jannard et al. |
| 2005/0224703 A1 | 10/2005 | Harada et al. |
| 2005/0233131 A1 | 10/2005 | Nishida et al. |
| 2006/0023160 A1 | 2/2006 | Cartier et al. |
| 2006/0033851 A1 | 2/2006 | Iori et al. |
| 2006/0092374 A1 | 5/2006 | Ishak |
| 2006/0146275 A1 | 7/2006 | Mertz |
| 2006/0147177 A1 | 7/2006 | Jing et al. |
| 2006/0147614 A1 | 7/2006 | Mizuno |
| 2006/0147723 A1 | 7/2006 | Jing et al. |
| 2006/0147724 A1 | 7/2006 | Mizuno |
| 2006/0158881 A1 | 7/2006 | Dowling |
| 2006/0196413 A1 | 9/2006 | Sugimura |
| 2006/0269697 A1 | 11/2006 | Sharp |
| 2006/0269733 A1 | 11/2006 | Mizuno et al. |
| 2007/0097509 A1 | 5/2007 | Nevitt et al. |
| 2007/0122626 A1 | 5/2007 | Qin et al. |
| 2007/0126983 A1 | 6/2007 | Godeau et al. |
| 2007/0195422 A1 | 8/2007 | Begon et al. |
| 2007/0236809 A1 | 10/2007 | Lippey et al. |
| 2007/0285615 A1 | 12/2007 | Yamamoto et al. |
| 2007/0287093 A1 | 12/2007 | Jing et al. |
| 2008/0068555 A1 | 3/2008 | Lau et al. |
| 2008/0074613 A1 | 3/2008 | Phillips |
| 2008/0094566 A1 | 4/2008 | Ishak et al. |
| 2008/0187749 A1 | 8/2008 | Cael et al. |
| 2008/0221674 A1 | 9/2008 | Blum et al. |
| 2008/0278676 A1 | 11/2008 | Croft et al. |
| 2008/0291140 A1 | 11/2008 | Kent et al. |
| 2008/0297879 A1 | 12/2008 | Tonar et al. |
| 2009/0040564 A1 | 2/2009 | Granger |
| 2009/0040588 A1 | 2/2009 | Tonal et al. |
| 2009/0058250 A1 | 3/2009 | Sin et al. |
| 2009/0122261 A1 | 5/2009 | Chou et al. |
| 2009/0128895 A1 | 5/2009 | Seo et al. |
| 2009/0141236 A1 | 6/2009 | Chen et al. |
| 2009/0141359 A1 | 6/2009 | Berni et al. |
| 2009/0152664 A1 | 6/2009 | Klem et al. |
| 2009/0268102 A1 | 10/2009 | Barazza |
| 2010/0003501 A1 | 1/2010 | Liu et al. |
| 2010/0054632 A1 | 3/2010 | McCormick et al. |
| 2010/0066974 A1 | 3/2010 | Croft et al. |
| 2010/0073765 A1 | 3/2010 | Brocheton |
| 2010/0102025 A1 | 4/2010 | Eagerton |
| 2010/0163165 A1 | 7/2010 | Jiang et al. |
| 2010/0182701 A1 | 7/2010 | Wu |
| 2010/0232003 A1 | 9/2010 | Baldy et al. |
| 2010/0232021 A1 | 9/2010 | Walker, Jr. et al. |
| 2010/0272990 A1 | 10/2010 | Bondesan et al. |
| 2010/0283956 A1 | 11/2010 | Jackson et al. |
| 2011/0043902 A1 | 2/2011 | Ishibashi et al. |

(56) References Cited

U.S. PATENT DOCUMENTS

| | | |
|---|---|---|
| 2011/0126345 A1 | 6/2011 | Matsumoto et al. |
| 2011/0164215 A1 | 7/2011 | Coco Martin |
| 2011/0205627 A1 | 8/2011 | Kobuchi et al. |
| 2011/0211154 A1 | 9/2011 | Aoyama et al. |
| 2011/0229660 A1 | 9/2011 | Reynolds |
| 2011/0255051 A1 | 10/2011 | McCabe et al. |
| 2012/0015111 A1 | 1/2012 | Mishina et al. |
| 2012/0044560 A9 | 2/2012 | Lam et al. |
| 2012/0137398 A1 | 6/2012 | Arnold |
| 2012/0137414 A1 | 6/2012 | Saylor |
| 2012/0217664 A1 | 8/2012 | Saitou et al. |
| 2012/0236249 A1 | 9/2012 | Miwa et al. |
| 2012/0236255 A1 | 9/2012 | Jiang et al. |
| 2012/0287395 A1 | 11/2012 | Tamura et al. |
| 2013/0107563 A1 | 5/2013 | McCabe et al. |
| 2013/0120821 A1 | 5/2013 | Chandrasekhar |
| 2013/0127078 A1 | 5/2013 | Qin et al. |
| 2013/0141693 A1 | 6/2013 | McCabe et al. |
| 2013/0161846 A1 | 6/2013 | Goodenough et al. |
| 2013/0235452 A1 | 9/2013 | You et al. |
| 2014/0036227 A1 | 2/2014 | Tamura et al. |
| 2014/0093661 A1 | 4/2014 | Trajkovska et al. |
| 2014/0232983 A1 | 8/2014 | Tokumaru et al. |
| 2014/0233105 A1 | 8/2014 | Schmeder |
| 2014/0268283 A1 | 9/2014 | Chandrasekhar |
| 2014/0334000 A1 | 11/2014 | Clerc et al. |
| 2015/0022777 A1 | 1/2015 | McCabe et al. |
| 2015/0109651 A1 | 4/2015 | Branda et al. |
| 2015/0131047 A1 | 5/2015 | Saylor et al. |
| 2015/0219931 A1 | 8/2015 | Grasso |
| 2015/0241602 A1 | 8/2015 | Avetisian, Sr. et al. |
| 2015/0272260 A1 | 10/2015 | Ryan et al. |
| 2015/0277146 A1 | 10/2015 | Crespo Vazquez et al. |
| 2015/0277150 A1 | 10/2015 | Granger et al. |
| 2015/0286073 A1 | 10/2015 | Blum |
| 2015/0362817 A1 | 12/2015 | Patterson et al. |
| 2015/0374550 A1 | 12/2015 | Saylor |
| 2016/0033837 A1 | 2/2016 | Bjornard et al. |
| 2016/0041408 A1 | 2/2016 | Carlson et al. |
| 2016/0048037 A1 | 2/2016 | McCabe et al. |
| 2016/0070119 A1 | 3/2016 | McCabe et al. |
| 2016/0185055 A1 | 6/2016 | Guadagnin |
| 2016/0209554 A1* | 7/2016 | Cheng .............. G02B 1/18 |
| 2016/0231595 A1 | 8/2016 | Grasso |
| 2017/0068113 A1 | 3/2017 | McCabe et al. |
| 2017/0075143 A1 | 3/2017 | Saylor et al. |
| 2017/0102558 A1 | 4/2017 | Saylor et al. |
| 2017/0205639 A1 | 7/2017 | McCabe et al. |
| 2020/0081270 A1 | 3/2020 | McCabe et al. |
| 2020/0081271 A1 | 3/2020 | McCabe et al. |
| 2020/0096792 A1 | 3/2020 | McCabe et al. |

FOREIGN PATENT DOCUMENTS

| | | | |
|---|---|---|---|
| CN | 101772723 A | | 7/2010 |
| CN | 102124394 A | | 7/2011 |
| CN | 103645568 A | | 3/2014 |
| CN | 107573835 A | * | 1/2018 |
| DE | 3534575 A1 | | 4/1986 |
| EP | 0 127 821 B1 | | 12/1984 |
| EP | 0 519 660 A1 | | 12/1992 |
| EP | 1 460 473 B1 | | 8/2007 |
| EP | 1 986 024 A1 | | 10/2008 |
| EP | 2 492 723 A1 | | 8/2012 |
| EP | 2 799 514 A1 | | 11/2014 |
| FR | 2 812 629 A1 | | 2/2002 |
| GB | 1154500 A | | 6/1969 |
| GB | 2522389 A | | 7/2015 |
| JP | S62-123621 U | | 8/1987 |
| JP | 63-008703 A | | 1/1988 |
| JP | H01-209423 A | | 8/1989 |
| JP | H02-132417 A | | 5/1990 |
| JP | H04-72347 A | | 3/1992 |
| JP | 05-202109 A | | 8/1993 |
| JP | H06-300992 A | | 10/1994 |
| JP | H09-43550 A | | 2/1997 |
| JP | 2000-258625 A | | 9/2000 |
| JP | 2001-506012 A | | 5/2001 |
| JP | 2004-524558 A | | 8/2004 |
| JP | 2006-031030 A | | 2/2006 |
| JP | 2007-025609 A | | 2/2007 |
| JP | 2008-304677 A | | 12/2008 |
| JP | 2009-058959 A | | 3/2009 |
| JP | 2009-128912 A | | 6/2009 |
| JP | 2010-204383 A | | 9/2010 |
| JP | 2010-262112 A | | 11/2010 |
| JP | 2011-175176 A | | 9/2011 |
| JP | 4987297 B2 | | 7/2012 |
| JP | 2013-011840 A | | 1/2013 |
| JP | 2013-524300 A | | 6/2013 |
| JP | 2014-531058 A | | 11/2014 |
| WO | WO 88/02871 A1 | | 4/1988 |
| WO | WO 97/35215 A1 | | 9/1997 |
| WO | WO 99/67681 A1 | | 12/1999 |
| WO | WO 02/14930 A1 | | 2/2002 |
| WO | WO 02/042629 A1 | | 5/2002 |
| WO | WO 02/059684 A2 | | 8/2002 |
| WO | WO 02/076632 A1 | | 10/2002 |
| WO | WO 03/058294 A2 | | 7/2003 |
| WO | WO 2004/031813 A1 | | 4/2004 |
| WO | WO 2007/094338 A1 | | 8/2007 |
| WO | WO 2008/014225 A3 | | 1/2008 |
| WO | WO 2008/110045 A1 | | 9/2008 |
| WO | WO 2008/118967 A1 | | 10/2008 |
| WO | WO 2009/011439 A1 | | 1/2009 |
| WO | WO 2009/152381 A1 | | 12/2009 |
| WO | WO 2010/111499 A1 | | 9/2010 |
| WO | WO 2010/142019 A1 | | 12/2010 |
| WO | WO 2011/068051 A1 | | 6/2011 |
| WO | WO 2011/105211 A1 | | 9/2011 |
| WO | WO 2011/127015 A1 | | 10/2011 |
| WO | WO 2011/130314 A1 | | 10/2011 |
| WO | WO 2012/079160 A1 | | 6/2012 |
| WO | WO 2012/119158 A1 | | 9/2012 |
| WO | WO 2013/034557 A1 | | 3/2013 |
| WO | WO 2013/051489 A1 | | 4/2013 |
| WO | WO 2013/054656 A1 | | 4/2013 |
| WO | WO 2013/070417 A1 | | 5/2013 |
| WO | WO 2013/074269 A1 | | 5/2013 |
| WO | WO 2013/123592 A1 | | 8/2013 |
| WO | WO 2013/169987 A1 | | 11/2013 |
| WO | WO 2013/177676 A1 | | 12/2013 |
| WO | WO 2014/011581 A2 | | 1/2014 |
| WO | WO 2014/022049 A1 | | 2/2014 |
| WO | WO 2014/055513 A1 | | 4/2014 |
| WO | WO 2015/044006 A1 | | 4/2015 |
| WO | WO 2015/170133 A1 | | 11/2015 |
| WO | WO 2015/179538 A1 | | 11/2015 |
| WO | WO 2016/054198 A1 | | 4/2016 |

OTHER PUBLICATIONS

Stockman and Sharpe, "The spectral sensitivities of the middle- and long-wavelength-sensitive cones derived from measurements in observers of known genotype," Vision Research 40, 2000, pp. 1711-1737.

International Search Report and Written Opinion dated Aug. 22, 2011, PCT Application No. US/2011/32172.

International Preliminary Report on Patentability and Written Opinion dated Oct. 16, 2012, International Application No. PCT/US11/32172, filed Apr. 12, 2011.

International Search Report and Written Opinion dated Feb. 5, 2013, International Application No. PCT/US2012/061060, filed Oct. 19, 2012.

Wilson, Carrie, "The How and Why of AR Coating," EyeCare Professional Magazine, Oct. 2010 Issue, retrieved on Oct. 9, 2013 from Internet at www.ecpmag.com.

"Product description: Lagoon sunglasses," Maui Jim website, printed on Feb. 18, 2014, web address: http://www.mauijim.com/lagoon.html, information on the page was publicly available at least as early as Nov. 2009.

(56) References Cited

OTHER PUBLICATIONS

International Search Report and Written Opinion dated Sep. 16, 2013, International Application No. PCT/US2013/040284, filed May 9, 2013.
"ANSI Z80.3-2010 American National Standard for Ophthalmics—Nonprescription Sunglass and Fashion Eyewear Requirements," Jun. 7, 2010, pp. 1-25.
British Standard, "Personal Eye-Equipment—Sunglasses and Sunglare Filters for General Use and Filters for Direct Observation of the Sun," Technical Committee CEN/TC 85, Sep. 2007, 46 pages.
Drum, Bruce, "FDA Regulation of Labeling and Promotional Claims in Therapeutic Color Vision Devices: A Tutorial," Visual Neuroscience, May 2004, vol. 21, No. 3, pp. 461-463.
International Preliminary Report on Patentability and Written Opinion dated Sep. 3, 2013, in PCT/US2012/027790.
International Preliminary Report on Patentability and Written Opinion dated Apr. 22, 2014, in PCT Application No. PCT/US2012/061060.
International Preliminary Report on Patentability and Written Opinion dated Nov. 20, 2014, in PCT/US2013/040284.
Kirkpatrick et al., "Optimizationby Simulated Annealing," Science, New Series, May 13, 1983, vol. 220, No. 4598, pp. 671-680.
Linear Programming, Feb. 28, 2011, http://en.wikipedia.org/w/index.php?title=Linear_programmming&oldid=416428507, 14 pages.
Moreland et al., "Quantitative Assessment of Commercial Filter Aids for Red-Green Colour Defectives," Ophthalmic and Physiological Optics, The Journal of the College of Optometrists, Sep. 2010, vol. 30, No. 5, pp. 685-692.
Rea et al., "Color Rendering: Beyond Pride and Prejudice," Color Research & Application, Dec. 2010, vol. 35, No. 6, pp. 401-409.
Sharp et al., "Retarder Stack Technology for Color Manipulation," SID Symposium Digest of Technical Papers, May 1999, vol. 30, No. 1, pp. 1072-1075.
Swillam et al., "The Design of Multilayer Optical Coatings Using Convex Optimization," Journal of Lightwave Technology, Apr. 2007, vol. 25, No. 4, pp. 1078-1085.
Tilsch et al., "Manufacturing of Precision Optical Coatings," Chinese Optics Letters, Apr. 30, 2010, vol. 8, Supplement, pp. 38-43.
Vorobyev et al., "Receptor Noise as a Determinant of Colour Thresholds," Proceedings of the Royal Society of London B, 1998, vol. 265, pp. 351-358.
Caswell, "Serious Shades: High style gives way to high tech as new performance sunglasses become sophisticated optical instruments," Popular Mechanics, Jul. 1988, vol. 165, No. 7, pp. 76-78.
Encyclopedia of Polymer Science and Technology—Plastics, Resins, Rubbers, Fibers, edited by Mark, H. et al, vol. 9, John Wiley & Sons, 1968, USA, pp. 50-53.
International Search Report and Written Opinion dated Jan. 13, 2016, in PCT Application No. PCT/US2015/053206.
International Preliminary Report on Patentability and Written Opinion dated Apr. 13, 2017, in PCT Application No. PCT /US2015/053206.
International Search Report and Written Opinion dated Oct. 7, 2015, in PCT Application No. PCT/US2015/031805.
International Preliminary Report on Patentability and Written Opinion dated Dec. 8, 2016, in PCT Application No. PCT/US2015/031805.
Nakamura et al., "Diffusion Coefficients of Disperse Dye to PE and PET Films in Supercritical Carbon Dioxide," School of Natural System, College of Science and Engineering, Kanazawa University, Japan, Proceedings of 9th International Symposium on Super Critical Fluids, May 18-20, 2009, Arachon, France, 6 pages.
International Search Report and Written Opinion dated Jul. 27, 2012, in PCT Application No. PCT/US2012/027790.
International Search Report and Written Opinion dated May 2, 2016 in PCT Application No. PCT/US2015/060103.
International Search Report and Written Opinion dated Jun. 1, 2016, in PCT Application No. PCT/US2015/065311.
X-Rite, A Guide to Understanding Color Communication, pp. 1-26, Mar. 2007, downloaded from http://www.xrite.com/learning/whitepapers/a-guide-to-understanding-color.
Exciton, "Product List," as archived Aug. 28, 2010 on archive.org in 2 pages.
Maui Jim, "All Sunglasses," as archived Mar. 30, 2009 on archive.org in 2 pages.
International Preliminary Report on Patentability and Written Opinion dated May 16, 2017, in PCT Application No. PCT/US2015/060103.
Maui Jim, "Terms of Use of This Website/Application," Oct. 22, 2018; 2 pgs.
A product page that describes the Maui Jim Lagoon 189-02 lens product as containing "PolarizedPlus®2," Sep. 21, 2012.
Lucatorto et al., Experimental Methods in the Physical Sciences, Chapter 2, Elsevier Inc. (2014), pp. 11-66.
Sakamoto, Yasuo, "Light Shielding and Visual Function—Challenge to Light-Shielding Glasses with Clear Color Lens," Journal of the Japanese Society for Cataract Research, vol. 22, pp. 24-28 (2010), with attached English machine translation.
International Search Report and Written Opinion, dated Apr. 12, 2019 in related PCT Application No. PCT/IB2019/050824.
"Absorber Dyes." Selective Visible and Infrared Absorbers—Absorber Dyes, 2009, exciton.luxottica.com/selective-visible-and-infrared-absorbers.html.
Extended European Search Report issued in counterpart European Patent Application No. EP 17 18 6801, dated Feb. 7, 2018.
New dual layer cellulose acetate anti fog lens rimless fashionable snow goggles (http://hubosports.en.alibaba.com/product/60119246566-215413686/New_dual_layer_cellulose_acetate_anti_fog_lens_rimless_fashionable_snow_goggles.html).
International Search Report and Written Opinion, dated Jan. 18, 2019 in International Application No. PCT/IB2018/058172; 19 pages.

\* cited by examiner

LENS WITH ANTI-FOG ELEMENT

INCORPORATION BY REFERENCE OF RELATED APPLICATIONS

This application is a continuation of U.S. application Ser. No. 15/337,573 filed on Oct. 28, 2016 which is a continuation of U.S. application Ser. No. 14/536,214 filed on Nov. 7, 2014 which is a continuation of International Application No. PCT/US2013/040284 filed May 9, 2013, titled EYEWEAR WITH LAMINATED FUNCTIONAL LAYERS which claims priority to U.S. Provisional Patent Application No. 61/645,543, filed May 10, 2012, titled EYEWEAR WITH LAMINATED FUNCTIONAL LAYERS. The entire contents of all of the above referenced applications are incorporated by reference herein and made part of this specification.

BACKGROUND

Field

This disclosure relates generally to eyewear and to lenses used in eyewear.

Description of Related Art

Eyeglasses include one or lenses attached to a frame that positions the lenses on the wearer's head. Lenses typically include at least one lens body made from a substantially rigid material. In some cases, one or more coatings are applied to the lens body in order to impart desired functional characteristics to the eyeglasses. Examples of functional coatings for eyewear include anti-reflection coatings and anti-static coatings.

SUMMARY

Example embodiments described herein have several features, no single one of which is indispensable or solely responsible for their desirable attributes. Without limiting the scope of the claims, some of the advantageous features will now be summarized.

Embodiments disclosed herein include eyewear that has one or more laminates applied to a lens body. In some embodiments, the lens body is constructed from a substantially rigid material having a curved shape. The lens body can have any desired curvature, including, for example, cylindrical, spherical or toroidal. A laminate can include a substantially flexible substrate and one or more functional layers or coatings applied to the substrate. In addition, one or more functional layers or coatings can be applied directly to the lens body. In certain embodiments, a bonding layer bonds a laminate to a convex and/or concave surface of the lens body. Examples of functional layers or coatings that can be applied to a laminate include anti-reflection coatings, interference stacks, hard coatings, flash mirrors, anti-static coatings, anti-fog coatings, other functional layers, or a combination of functional layers.

Some embodiments provide a lens that includes a lens body including a substantially rigid material, the lens body having a convex surface and a concave surface; a laminate including a flexible thin polymeric material having a first surface and a second surface opposite the first surface; a multi-layer interference coating including two or more thin film layers of high refractive index material and two or more thin film layers of low refractive index material disposed on the first surface of the laminate; and a hydrophobic coating disposed on the concave surface of the lens body. The second surface of the laminate can be bonded to the convex surface of the lens body.

In certain embodiments, eyewear includes a frame and a lens connected to the frame. The lens body can have any suitable thickness, such as, for example, between about 0.02 in. and 0.1 in. The substantially rigid material can be polycarbonate or any other suitable lens material. The flexible thin polymeric material can be biaxially-oriented polyethylene terephthalate polyester film, a plastic film, or any other suitable material. The flexible thin polymeric material can have a suitable thickness, such as, for example, between about 0.002 in. and 0.01 in. The lens can include a hard coat layer disposed on the convex surface of the lens body between the substantially rigid material of the lens body and the laminate. The hard coat layer can include a substantially uniform layer of polymeric material configured to increase an abrasion resistance, a mechanical durability, and/or a chemical resistance of the lens body. In some embodiments, the hard coat layer includes a sol-gel material.

In certain embodiments, the lens includes a hard coat layer disposed on the second surface of the laminate between the substantially rigid material of the lens body and the laminate. The hard coat layer can include a substantially uniform layer of polymeric material configured to increase an abrasion resistance, a mechanical durability, and/or a chemical resistance of the laminate. The laminate can be bonded to the lens body through a thermally-cured adhesive layer, through a UV-cured adhesive layer, or using any other suitable bonding technique. In some embodiments, the lens provides an optical correction.

In some embodiments, the lens includes an electrochromic functional layer disposed between the multi-layer interference coating and the first surface of the laminate. The electrochromic functional layer can include a dichroic dye guest-host device configured to provide variable light attenuation.

The multi-layer interference coating can be, for example, an anti-reflective coating or a reflective coating. The lens can include a backside laminate bonded to the hydrophobic coating disposed on the concave surface of the lens body, the backside laminate including a flexible thin polymeric material having a first surface and a second surface opposite the first surface. The lens can include an anti-static coating disposed on the second surface of the backside laminate.

Some embodiments provide a method of manufacturing a lens. The method can include forming a lens body from a substantially rigid material, the lens body including a convex surface and a concave surface; depositing a hydrophobic coating on the concave surface of the lens body; providing a laminate including a flexible thin polymeric material having a first surface and a second surface opposite the first surface; depositing on the first surface of the laminate a multi-layer interference coating including two or more thin film layers of high refractive index material and two or more thin film layers of low refractive index material; and bonding the second surface of the laminate to the convex surface of the lens body.

In certain embodiments, the lens body is formed through injection molding. The substantially rigid material can be polycarbonate or another suitable material. Depositing the hydrophobic coating can include coating the lens body with a hydrophobic substance by immersing the lens body in the hydrophobic substance. Bonding the second surface of the laminate to the convex surface of the lens body can include applying a UV-curable adhesive to the convex surface of the lens body and curing the UV-curable adhesive such that the laminate and the lens body are bonded together.

Eyewear can include a frame and a lens manufactured according to one of the embodiments disclosed herein attached to the frame.

Certain embodiments provide eyewear having electrochromic functionality. The eyewear can include a frame and a lens attached to the frame. The lens can include a lens body including a substantially rigid material, the lens body having a convex surface and a concave surface; and a laminate including a flexible thin polymeric material having a first surface and a second surface opposite the first surface. An electrochromic functional layer can be disposed on the first surface of the flexible thin polymeric material. The electrochromic functional layer can include a dichroic dye guest-host device configured to provide variable light attenuation. An electrode can be electrically coupled to the electrochromic functional layer. A power source can be attached to the eyewear and electrically coupled to the electrode. A user interface element can be disposed on the eyewear and configured to change an amount of power provided to the electrode from the power source.

In some embodiments, changing the amount of power provided to the electrode changes a state of the electrochromic functional layer. The user interface element can include a touch-sensitive element that changes the electrochromic functional layer from dark to light when activated. The eyewear can include a multi-layer interference coating including two or more thin film layers of high refractive index material and two or more thin film layers of low refractive index material disposed on the electrochromic functional layer. The eyewear can include a hydrophobic coating disposed on the concave surface of the lens body.

Some embodiments provide a lens including a frontside laminate including a flexible thin polymeric material having a first surface and a second surface opposite the first surface; a lens body including a substantially rigid material, the lens body having a convex surface and a concave surface; a backside laminate including a flexible thin polymeric material having a first surface and a second surface opposite the first surface; a frontside transition layer disposed between the second surface of the frontside laminate and the convex surface of the lens body, the frontside transition layer including an adhesion layer and a frontside functional layer; and a backside transition layer disposed between the first surface of the backside laminate and the concave surface of the lens body, the backside transition layer including an adhesion layer and a backside functional layer.

The functional layers can have many configurations. For example, in some embodiments, the frontside functional layer includes a multi-layer interference coating including two or more thin film layers of high refractive index material and two or more thin film layers of low refractive index material. The backside functional layer can include a hydrophobic coating. A flash mirror coating can be disposed on the first surface of the frontside laminate. A hydrophobic coating can be disposed on the second surface of the backside laminate. An electrochromic functional layer can be disposed on the first surface of the frontside laminate. The electrochromic functional layer can include a dichroic dye guest-host device configured to provide variable light attenuation.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

FIGS. 1 and 1A illustrate an example embodiment of eyewear having a laminate attached to the convex side of a lens body.

FIGS. 2 and 2A illustrate an example embodiment of eyewear having a laminate attached to the concave side of a lens body.

FIGS. 3 and 3A illustrate an example embodiment of an eyewear having laminates attached to convex and concave sides of a lens body.

FIGS. 4 and 4A illustrate an example embodiment of eyewear having laminates attached to lens bodies.

DETAILED DESCRIPTION OF PREFERRED EMBODIMENTS

Figure 1:
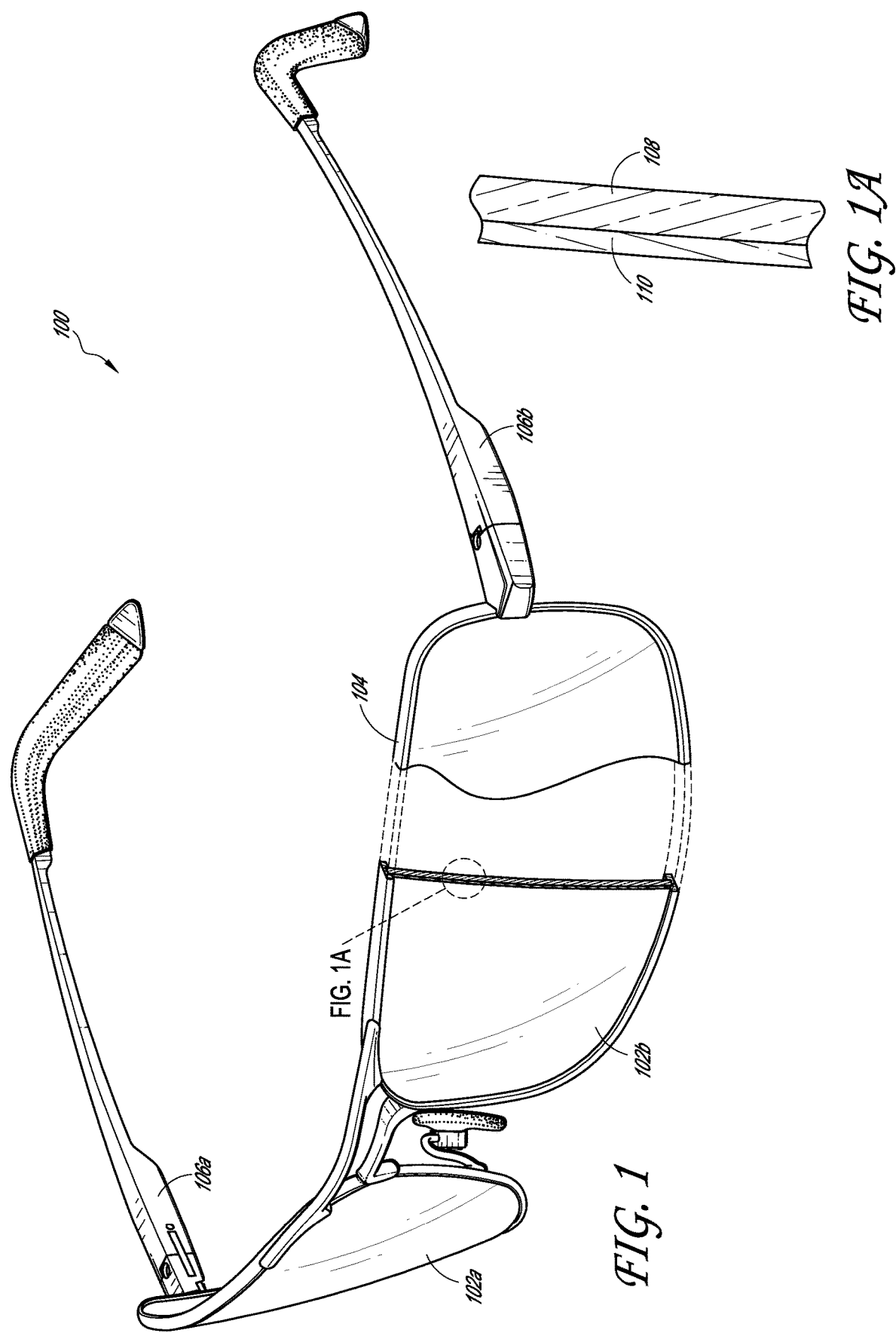

Although certain preferred embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Lenses having an anti-reflective coating on a convex side of the lens and a hydrophobic coating on a concave side of the lens can provide desirable characteristics in eyewear in applications such as goggles, sunglasses, corrective lenses, and the like. However, providing a lens with such a configuration of coatings can be challenging using generally accepted coating techniques because the application of a coating can degrade the performance of another. For example, applying a hydrophobic coating before applying an anti-reflective coating can result in degrading the hydrophobic coating as a result of the physical or chemical vapor deposition process used to apply the anti-reflective coating. Similarly, applying an anti-reflective coating before a hydrophobic coating can degrade the performance of the anti-reflective coating as a result of an immersion process used to apply the hydrophobic coating.

In some embodiments, a lens receives a hydrophobic coating through an immersion process before receiving an anti-reflective coating through vapor deposition. The immersion technique can generally include the steps of immersing the lens element in a coating solution and allowing a hydrophobic layer to attach to the object through electrostatic interactions or chemical reactions. For example, a lens can be coated with a hydrophobic material by immersing it in a hydrophobic solution and then withdrawing it after a certain interval under controlled temperature and/or atmospheric conditions. The coating quality can be controlled at least in part by the immersion time, the temperature of the process, and/or the content of the solution.

In certain embodiments, an object, such as a lens body, is immersed into a hydrophobic liquid solution using a dip-coating apparatus or another suitable apparatus. The object can be immersed at room temperature. The duration of immersion can be about one minute or another suitable period of time. In certain embodiments, the hydrophobic liquid solution includes a coating material solute, such as a fluorinated coating identified as KY-164 from Shin-Etsu Chemical Co., and a solvent, such as NOVEC® Engineered Fluid HFE-7200 from 3M Company of St. Paul, Minn.

After immersion in the solution, the object can be cured. For some hydrophobic coatings, curing can be accomplished by exposing the coated object to a temperature of 60° C. for about an hour and/or allowing the object to cure at room temperature for a couple of days. After application of the hydrophobic coating using an immersion process, the entire lens or a portion of the lens can be coated with a hydrophobic layer.

Other processes can be used to coat the lens including, for example, dip coating, spray coating, flow coating, spin coating, capillary coating, roll coating, chemical coating, printing technique, drying and curing techniques, other coating techniques, or any combination of coating techniques. In a subsequent process to apply an anti-reflective coating to the lens, the effectiveness of the hydrophobic coating can be degraded because of cleaning and vapor deposition steps. The process to apply an anti-reflective coating or interference stack can generally include placing the lens in a low-pressure or near vacuum container, pre-treating the deposition surface of the object using an ion source, vaporizing source material, transporting the material to the lens, and depositing the material on the lens. For example, to pre-treat the lens, one or more process gases can be ionized to create a plasma that cleans the deposition surface. The pre-treatment step can utilize a DC glow discharge or End-Hall ion source for pre-treatment and/or cleaning of the object prior to depositing the film. An electron beam can then be used to evaporate a target material (the material to be deposited on the lens). The evaporated material can be transported to and deposited on the lens. The evaporation, transportation, and deposition steps of the process can be repeated for each film layer in an interference stack. As a result of this process, the previously-applied hydrophobic coating can be damaged or the effectiveness of the coating can be degraded due to pretreatment and/or the deposition of the film on the lens.

In some embodiments, one or more functional layers, such as, for example, anti-reflection coatings, are applied using a liquid deposition process. A liquid deposition process can include any process where a solution is deposited on a lens or lens element and processed to form a thin film or coating on the lens or lens element. For example, a functional layer can be applied through spin coating. The lens element to receive the functional layer can be placed in a device configured to spin the lens element, and the device can be positioned in a chamber configured to, for example, control the coating environment, protect the lens element from contaminants during the coating process, prevent or reduce the probability of the escape of volatile portions of a coating solution, to prevent or reduce the probability of contaminants being introduced into the coating, or any combination of these. A coating solution can be injected into the chamber through a coating solution inlet to be applied substantially uniformly throughout the surface of the lens element. As the coating solution is applied, the lens element is rotated by suitable means, and either simultaneous with the application of the coating or shortly after commencement of introduction of the coating solution, drying air can be introduced to dry the coating solution. The duration of the flow of the drying air can be configured to sufficiently dry the coating solution such that it can adhere sufficiently to the surface of the lens element. The spin direction, rotation speed, application rate, time cycles, and other such parameters can be varied for the particular coating being applied and the properties of the target lens element. For example, the parameters for a lower viscosity coating, such as an anti-reflective coating layer, can be different from the parameters that are used to apply a higher viscosity coating, such as an abrasion resistant hard-coat. Various functional layers can be applied using liquid deposition techniques, such as anti-reflective coatings, hard coats, mirror coatings, impact enhancement, tinting coatings and the like.

In some embodiments, a lens receives an anti-reflective coating through vapor deposition before receiving a hydrophobic coating through an immersion process. The application of the anti-reflective coating or interference stack can follow the same steps described herein above. For example, the interference stack can be deposited on the lens through a physical vapor deposition process. Other processes could be used, including chemical vapor deposition, directed vapor deposition, vapor deposition using magnetron sputtering, vapor deposition using plasma polymerization, another deposition technique, or any combination of deposition techniques. In a subsequent process to apply a hydrophobic coating to the lens, the effectiveness of the anti-reflective coating can be degraded because of the deposition of the hydrophobic coating. For example, immersion coating the lens can result in the entire lens being coated with the hydrophobic coating. The hydrophobic coating can alter the optical properties of the anti-reflective coating. In addition, the process steps used to apply both functional elements to a lens body can substantially increase the manufacturing time and/or cost for building the lens because each process is done separately, consuming more time and/or labor than if the processes were carried out in parallel.

In some embodiments, a lens is provided that has an anti-reflective laminate on a convex side and a hydrophobic laminate on a concave side such that both anti-reflective and hydrophobic functions can be imparted to the lens without substantially altering the performance of either laminate. For example, a flexible substrate can be coated with an interference stack on one side and an adhesion layer on the other, and attached to a lens body to create a lens having an interference stack on one surface. As another example, a substrate can include a hydrophobic or anti-fog coating and an adhesion layer. The substrate can be attached to a lens body to create a lens having a hydrophobic functional layer. As another example, a first laminate including a first substrate, an anti-reflective coating, and an adhesion layer and a second laminate including a second substrate, a hydrophobic coating, and an adhesion layer can be attached to a convex and concave side of a lens body, respectively. As a result, a lens can be provided that has an anti-reflective coating and a hydrophobic coating such that functional properties of one coating have not been substantially altered due to the addition of another coating. Other functional elements can be added to a lens according to some embodiments disclosed herein including, for example, a flash mirror, photochromic layer, anti-static coating, liquid-containing layer, electrochromic layer, polarizer, hard coat, index matching layer, chroma enhancement, color enhancement, contrast enhancement, trichoic filter, glass layer, hybrid glass-plastic layer, AR coating, anti-fog coating, interference stack, or any combination of these.

Although some embodiments will be discussed below in terms of lenses having "cylindrical" or "spherical" front and rear surfaces (surfaces which conform substantially to a portion of the surface of a sphere or cylinder, respectively), it will be understood by those having ordinary skill in the art that, in some embodiments, lenses having different surface geometries can be used. Additionally, it will be understood that lenses of many front elevational shapes and orientations in the as-worn position can be used, beyond those illustrated herein. In particular, either the front or rear surface of either lens may conform to the surface of a toroidal or other aspheric geometry.

Overview of Eyewear Having One or More Laminates Attached to a Lens Body

FIGS. 1-4 show a perspective view of some embodiments of eyewear with a portion cut-away to show example configurations of lens elements. Referring to FIGS. 1-4, there is illustrated a perspective view of some embodiments of eyewear 100 having first and second lenses 102a and 102b, frame 104, and earstems 106a and 106b. The embodiments shown in FIGS. 1-4 illustrate one or more laminates affixed to one or more lens bodies incorporated into an example eyeglass design. It should be noted that the thicknesses and relative thicknesses of the various lens elements are not drawn to scale but are drawn to more easily illustrate certain aspects of the eyewear 100. The eyewear 100 can be of any type, including general-purpose eyewear, special-purpose eyewear, sunglasses, driving glasses, sporting glasses, goggles, indoor eyewear, outdoor eyewear, vision-correcting eyewear, contrast-enhancing eyewear, chroma-enhancing eyewear, color-enhancing eyewear, color-altering eyewear, eyewear designed for another purpose, or eyewear designed for a combination of purposes. Lenses and frames of many other shapes and configurations may be used, as will become apparent based upon the disclosure herein.

FIGS. 1-4 illustrate eyewear 100 having lenses 102a, 102b. The lenses 102a and 102b can be corrective lenses or non-corrective lenses and can be made of any of a variety of optical materials including glasses or plastics such as acrylics or polycarbonates. The lenses can have various shapes. For example, the lenses 102a, 102b can be flat, have 1 axis of curvature, 2 axes of curvature, or more than 2 axes of curvature, the lenses 102a, 102b can be cylindrical, parabolic, spherical, flat, or elliptical, or any other shape such as a meniscus or catenoid. When worn, the lenses 102a, 102b can extend across the wearer's normal straight ahead line of sight, and can extend substantially across the wearer's peripheral zones of vision. As used herein, the wearer's normal line of sight shall refer to a line projecting straight ahead of the wearer's eye, with substantially no angular deviation in either the vertical or horizontal planes. In some embodiments, the lenses 102a, 102b extend across a portion of the wearer's normal straight ahead line of sight.

The outside surface of lenses 102a or 102b can conform to a shape having a smooth, continuous surface having a constant horizontal radius (sphere or cylinder) or progressive curve (ellipse, toroid or ovoid) or other aspheric shape in either the horizontal or vertical planes. The geometric shape of other embodiments can be generally cylindrical, having curvature in one axis and no curvature in a second axis. The lenses 102a, 102b can have a curvature in one or more dimensions. For example, the lenses 102a, 102b can be curved along a horizontal axis. As another example, lenses 102a, 102b can be characterized in a horizontal plane by a generally arcuate shape, extending from a medial edge throughout at least a portion of the wearer's range of vision to a lateral edge. In some embodiments, the lenses 102a, 102b are substantially linear (not curved) along a vertical axis. In some embodiments, the lenses 102a, 102b have a first radius of curvature in one region, a second radius of curvature in a second region, and transition sites disposed on either side of the first and second regions. The transition sites can be a coincidence point along the lenses 102a, 102b where the radius of curvature of the lenses 102a, 102b transitions from the first to the second radius of curvature, and vice versa. In some embodiments, lenses 102a, 102b can have a third radius of curvature in a parallel direction, a perpendicular direction, or some other direction. In some embodiments, the lenses 102a, 102b can lie on a common circle. The right and left lenses in a high-wrap eyeglass can be canted such that the medial edge of each lens will fall outside of the common circle and the lateral edges will fall inside of the common circle. Providing curvature in the lenses 102a, 102b can result in various advantageous optical qualities for the wearer, including reducing the prismatic shift of light rays passing through the lenses 102a, 102b, and providing an optical correction.

A variety of lens configurations in both horizontal and vertical planes are possible. Thus, for example, either the outer or the inner or both surfaces of the lens 102a or 102b of some embodiments can generally conform to a spherical shape or to a right circular cylinder. Alternatively either the outer or the inner or both surfaces of the lens may conform to a frusto-conical shape, a toroid, an elliptic cylinder, an ellipsoid, an ellipsoid of revolution, other asphere or any of a number of other three dimensional shapes. Regardless of the particular vertical or horizontal curvature of one surface, however, the other surface may be chosen such as to minimize one or more of power, prism, and astigmatism of the lens in the mounted and as-worn orientation.

The lenses 102a, 102b can be linear (not curved) along a vertical plane (e.g., cylindrical or frusto-conical lens geometry). In some embodiments, the lenses 102a, 102b can be aligned substantially parallel with the vertical axis such that the line of sight is substantially normal to the anterior surface and the posterior surface of the lenses 102a, 102b. In some embodiments, the lenses 102a, 102b are angled downward such that a line normal to the lens is offset from the straight ahead normal line of sight by an angle ϕ. The angle ϕ of offset can be greater than about 0° and/or less than about 30°, or greater than about 10° and/or less than about 20°, or about 15°, although other angles ϕ outside of these ranges may also be used. Various cylindrically shaped lenses may be used. The anterior surface and/or the posterior surface of the lenses 102a, 102b can conform to the surface of a right circular cylinder such that the radius of curvature along the horizontal axis is substantially uniform. An elliptical cylinder can be used to provide lenses that have non-uniform curvature in the horizontal direction. For example, a lens may be more curved near its lateral edge than its medial edge. In some embodiments, an oblique (non-right) cylinder can be used, for example, to provide a lens that is angled in the vertical direction.

In some embodiments, the eyewear 100 incorporates canted lenses 102a, 102b mounted in a position rotated laterally relative to conventional centrally oriented dual lens mountings. A canted lens may be conceived as having an orientation, relative to the wearer's head, which would be achieved by starting with conventional dual lens eyewear having centrally oriented lenses and bending the frame inwardly at the temples to wrap around the side of the head. When the eyewear 100 is worn, a lateral edge of the lens wraps significantly around and comes in close proximity to the wearer's temple to provide significant lateral eye coverage.

A degree of wrap may be desirable for aesthetic styling reasons, for lateral protection of the eyes from flying debris, or for interception of peripheral light. Wrap may be attained by utilizing lenses of tight horizontal curvature (high base), such as cylindrical or spherical lenses, and/or by mounting each lens in a position which is canted laterally and rearwardly relative to centrally oriented dual lenses. Similarly, a high degree of rake or vertical tilting may be desirable for aesthetic reasons and for intercepting light, wind, dust or other debris from below the wearer's eyes. In general, "rake" will be understood to describe the condition of a lens, in the as-worn orientation, for which the normal line of sight strikes a vertical tangent to the lens 102a or 102b at a non-perpendicular angle.

The lenses 102a, 102b can be provided with anterior and posterior surfaces and a thickness therebetween, which can be variable along the horizontal direction, vertical direction, or combination of directions. In some embodiments, the lenses 102a, 102b can have a varying thickness along the horizontal or vertical axis, or along some other direction. In some embodiments, the thickness of the lenses 102a, 102b tapers smoothly, though not necessarily linearly, from a maximum thickness proximate a medial edge to a relatively lesser thickness at a lateral edge. The lenses 102a, 102b can have a tapering thickness along the horizontal axis and can be decentered for optical correction. In some embodiments, the lenses 102a, 102b can have a thickness configured to provide an optical correction. For example, the thickness of the lenses 102a, 102b can taper from a thickest point at a central point of the lenses 102a, 102b approaching lateral segments of the lenses 102a, 102b. In some embodiments, the average thickness of the lenses 102a, 102b in the lateral segments can be less than the average thickness of the lenses 102a, 102b in the central zone. In some embodiments, the thickness of the lenses 102a, 102b in at least one point in the central zone can be greater than the thickness of the lenses 102a, 102b at any point within at least one of the lateral segments.

In some embodiments, the lenses 102a, 102b can be finished, as opposed to semi-finished, with the lenses 102a, 102b being contoured to modify the focal power. In some embodiments, the lenses 102a, 102b can be semi-finished so that the lenses 102a, 102b can be capable of being machined, at some time following manufacture, to modify their focal power. In some embodiments, the lenses 102a, 102b can have optical power and can be prescription lenses configured to correct for near-sighted or far-sighted vision. The lenses 102a, 102b can have cylindrical characteristics to correct for astigmatism.

The eyewear 100 can include a mounting frame 104 configured to support the lenses 102a, 102b. The mounting frame 104 can include orbitals that partially or completely surround the lenses 102a, 102b. Referring to FIGS. 1-4, it should be noted that the particular mounting frame 104 is not essential to the embodiments disclosed herein. The frame 104 can be of varying configurations and designs, and the illustrated embodiments shown in FIGS. 1-4 are provided for exemplary purposes only. As illustrated, the frame 104 may include a top frame portion and a pair of ear stems 106a, 106b that are pivotably connected to opposing ends of the top frame portion. Further, the lenses 102a, 102b may be mounted to the frame 104 with an upper edge of the lens 102a or 102b extending along or within a lens groove and being secured to the frame 104. For example, the upper edge of the lens 102a or 102b can be formed in a pattern, such as a jagged or non-linear edge, and apertures or other shapes around which the frame 104 can be injection molded or fastened in order to secure the lens 102a or 102b to the frame 104. Further, the lenses 102a, 102b can be removably attachable to the frame 104 by means of a slot with interfitting projections or other attachment structure formed in the lenses 102a, 102b and/or the frame 104.

It is also contemplated that the lenses 102a, 102b can be secured along a lower edge of the frame 104. Various other configurations can also be utilized. Such configurations can include the direct attachment of the ear stems 106a, 106b to the lenses 102a, 102b without any frame, or other configurations that can reduce the overall weight, size, or profile of the eyeglasses. In addition, various materials can be utilized in the manufacture of the frame 104, such as metals, composites, or relatively rigid, molded thermoplastic materials which are well known in the art, and which can be transparent or available in a variety of colors. Indeed, the mounting frame 104 can be fabricated according to various configurations and designs as desired. In some embodiments, the frame 104 is configured to retain a unitary lens that is placed in front of both eyes when the eyewear is worn. Goggles can also be provided that include a unitary lens that is placed in front of both eyes when the goggles are worn.

The eyewear 100 can include a pair of earstems 106a, 106b pivotably attached to the frame 104. In some embodiments, the earstems 106a, 106b attach directly to the lenses 102a, 102b. The earstems 106a, 106b can be configured to support the eyewear 100 when worn by a user. For example, the earstems 106a, 106b can be configured to rest on the ears of the user. In some embodiments, the eyewear 100 includes a flexible band used to secure the eyewear 100 in front of the user's eyes in place of earstems 106a, 106b.

The lenses 102a, 102b include a lens body 108 and a laminate 110. The laminate 110 can be substantially permanently affixed to the lens body 108, or the laminate 110 can be configured to be separable from the lens body 108. In some embodiments, the laminate 110 is configured to be removable such that a user, manufacturer, or retailer can apply, remove, or change the laminate 110 after manufacture of the eyewear 100. In this way, a variety of functional elements can be introduced into the eyewear 100 increasing the possible utility of the eyewear 100 because one pair of glasses or goggles can be altered to provide functionality suitable for different occasions.

Each of the laminate 110 and lens body 108 can include one or more layers that provide functional aspects to the lens. For example, the lens body 108 and laminate 110 can include a polarizing layer, one or more adhesive layers, a photochromic layer, electrochromic material, a hard coat, a flash mirror, a liquid-containing layer, an antireflection coating, a mirror coating, an interference stack, chroma enhancing dyes, an index-matching layer, a scratch resistant coating, a hydrophobic coating, an anti-static coating, chroma enhancement dyes, color enhancement elements, trichoic filters, glass layers, hybrid glass-plastic layers, anti-reflective coatings, other lens elements, or a combination of lens components. If the lens 102 includes a photochromic layer, the photochromic material can include a neutral density photochromic or any other suitable photochromic. At least some of the lens components and/or materials can be selected such that they have a substantially neutral visible light spectral profile. In some embodiments, the visible light spectral profiles can cooperate to achieve any desired lens chromaticity, a chroma-enhancing effect, color enhancement, another goal, or any combination of goals. The polarizing layer, the photochromic layer, anti-reflection layer, hydrophobic coating, hard coat, and/or other functional layers can be incorporated into the lens body 108, the laminate 110, or both. In some embodiments, the lenses 102a, 102b include one or more lens coatings on the lens body 108, the laminate 110, or both.

In some embodiments, one or more advantages can be realized in at least some circumstances when a lens function, such as, for example, an anti-reflection film, is added to a lens body by a lamination process. For example, functional elements such as optical filters, mirror elements, anti-fog layers, interference stacks, light polarizers, and photochromic layers can be incorporated into the lens 102a or 102b without using processes to coat the surface of the lens. As described herein, coating or deposition processes sometimes incorporate steps that can substantially degrade or impair certain functional lens elements or layers. Certain coating processes create surfaces that are not entirely smooth or uniform. Thus, undesirable and unpredictable optical effects that would otherwise be expected to occur in the lens 102a or 102b if the surface were coated, are reduced, minimized, or eliminated altogether when the lenses 102a, 102b are manufactured according to techniques described herein.

In some embodiments, a lens 102a or 102b includes an injection molded, polymeric lens body 108 having a concave surface and a convex surface. The lens body 108 can be formed of polycarbonate (or PC), allyl diglycol carbonate monomer (being sold under the brand name CR-39®), glass, nylon, polyurethane, polyethylene, polyimide, polyethylene terephthalate (or PET), biaxially-oriented polyethylene terephthalate polyester film (or BoPET, with one such polyester film sold under the brand name MYLAR®), acrylic (polymethyl methacrylate or PMMA), a polymeric material, a co-polymer, a doped material, any other suitable material, or any combination of materials. The lens body 108 can be rigid and other layers of the lens can conform to the shape of the lens body 108 such that the lens body 108 dictates the shape of the lens 102a or 102b. The lens body 108 can be symmetrical across a vertical axis of symmetry, symmetrical across a horizontal axis of symmetry, symmetrical across another axis, or asymmetrical. In some embodiments, the front and back surfaces of the lens body 108 can conform to the surfaces of respective cylinders that have a common center point and different radii. In some embodiments, the lens body can have a front and back surfaces that conform to the surfaces of respective cylinders that have center points offset from each other, such that the thickness of the lens body 108 tapers from a thicker central portion to thinner end portions. The surfaces of the lens body 108 can conform to other shapes, as discussed herein, such as a sphere, toroid, ellipsoid, asphere, plano, frusto-conical, and the like. In some embodiments, a thermoforming process can be used to conform the laminate 110 to the lens body 108 having a shape described herein.

The lens body 108 can be contoured during initial formation to have an optical magnification characteristic that modifies the focal power of the lens 102a or 102b. In some embodiments, the lens body 108 can be machined after initial formation to modify the focal power of the lens 102a or 102b. The lens body 108 can provide a substantial amount of the optical power and magnification characteristics to the lens 102a or 102b. In some embodiments, the lens body 108 provides the majority of the optical power and magnification characteristics. Apportioning the majority of optical power and magnification to the lens body 108 can permit selection of lens body 108 materials and lens body 108 formation techniques that provide improved lens 102a, 102b optical power and magnification characteristics, without adversely affecting selection of laminate 110 materials and formation techniques.

The lens body 108 can be injection molded, although other processes can be used to form the shape of the lens blank body, such as thermoforming or machining. In some embodiments, the lens body 108 is injection molded and includes a relatively rigid and optically acceptable material such as polycarbonate. The curvature of the lens body 108 would thus be incorporated into a molded lens blank. A lens blank can include the desired curvature and taper in its as-molded condition. One or two or more lens bodies of the desired shape may then be cut from the optically appropriate portion of the lens blank as is understood in the art. In some embodiments, the frame 104 is provided with a slot or other attachment structure that cooperates with the molded and cut shape of the lens body 108 and laminate 110 to minimize deviation from, and even improve retention of its as-molded shape. In some embodiments, the lens body 108 can be stamped or cut from flat sheet stock and then bent into the curved configuration using a process such as thermoforming. This curved configuration can then be maintained by the use of a relatively rigid, curved frame 104, or by heating the curved sheet to retain its curved configuration.

The laminate 110 can be attached to the lens body 108, for example, through a thermally-cured adhesive layer, a UV-cured adhesive layer, electrostatic adhesion, pressure sensitive adhesives, or any combination of these. Examples of bonding technologies that may be suitable for attaching the laminate 110 to the lens body 108 include thermal welding, fusing, pressure sensitive adhesives, polyurethane adhesives, electrostatic attraction, thermoforming, other types of adhesives, materials curable by ultraviolet light, thermally curable materials, radiation-curable materials, other bonding methods, other bonding materials, and combinations of methods and/or materials. In some embodiments, any technique suitable for affixing the laminate 110 to the lens body 108 can be used. Some embodiments of a lens 102a or 102b includes a lens body 108 and a laminate 110 that are bonded together. In some embodiments, the laminate 110 and the lens body 108 can be integrally connected to each other and can be adhesively bonded together.

The laminate 110 can include a single layer or multiple layers. The laminate 110 can have one or more layers in single or multiple layer form that can be coated with a hard coat or a primer. For example, the laminate 110 can be a single layer of polycarbonate, PET, polyethylene, acrylic, nylon, polyurethane, polyimide, BoPET, another film material, or a combination of materials. As another example, the laminate can include multiple layers of film, where each film layer includes polycarbonate, PET, polyethylene, acrylic, nylon, polyurethane, polyimide, BoPET, another film material, or a combination of materials.

The laminate 110 can include several layers that serve various functions within the lenses 102a, 102b. In some embodiments, one or more layers in the laminate 110 can provide optical properties to the lenses 102a, 102b such as optical filtering, polarization, photochromism, electrochromism, partial reflection of incoming visible light, chroma enhancement, color enhancement, color alteration, or any combination of these. In some embodiments, one or more layers within the laminate 110 can provide mechanical protection to the lenses 102a, 102b or other layers within the laminate 110, reduce stresses within the laminate 110, or improve bonding or adhesion among the layers in the laminate 110 and/or between the laminate 110 and the lens body 108. In some embodiments, the laminate 110 can include layers that provide additional functionality to the lenses 102a, 102b such as, for example, anti-reflection functionality, anti-static functionality, anti-fog functionality, scratch resistance, mechanical durability, hydrophobic functionality, reflective functionality, darkening functionality, aesthetic functionality including tinting, or any combination of these.

As an example, the laminate 110 can include one or more layers that can serve to thermally insulate the laminate 110 such that it can be used in high temperature molding processes without subjecting the certain functional layers to temperatures sufficient to significantly degrade their optical performance. In some embodiments, the laminate 110 can serve as a thermally isolating element or vehicle that can incorporate functional elements that may be degraded if subjected to high temperature manufacturing processes. As such, the laminate 110 can be used to incorporate these types of functional elements into lenses that otherwise are formed and/or manufactured using high temperature processes. As an example, the laminate 110 can include a substrate with one or more functional coatings deposited thereon. The functional coatings can include elements that would be degraded or whose performance would be altered if subjected to high temperatures, such as certain chroma enhancement dyes disclosed in U.S. Patent Application Publication No. 2013/0141693, as known to one skilled in the art. The laminate 110 could then be bonded to the lens body 108 using a UV-cured adhesive, thus thermally isolating the laminate 110 and the included functional layers from the high temperature processes associated with the manufacture of the lens body 108.

As an example of incorporating functionality into a lens 102, the laminate 110 or the lens body 108 can include layers or elements that serve to tint the lens 102. Tinting can be added to a lens element in different ways. In some embodiments, color can be deposited on the lens element using a vapor or liquid source. The color can coat the lens element or it can penetrate into the element. In some embodiments, color can be added to a material used to make the lens element, such as adding powdered color or plastic pellets to material that is extruded, injection molded, or otherwise molded into a lens element. In some embodiments where liquids are used, the color can be added by a dip process. In such embodiments, a gradient tint or bi-gradient tint can be achieved through the dip process. In certain embodiments, a liquid coloring technique can be used to tint one or more lens elements. For example, liquid dye can be added to the polymer during an injection molding process.

By applying a tint to the laminate 110 or another layer that becomes a part of the laminate 110, a substantial increase in manufacturing capacity can be realized because of the nature of manufacturing a laminates. Another advantageous feature can be that undesired color transfer, e.g. to lens cloths of packaging, can be reduced or eliminated by not positioning the tinted layer on an exterior surface of the lens, e.g. putting the tinted layer between protective layers. Moreover, tinting can be applied to layers which do not experience high temperature processes during manufacture which can protect chromophores that may have poor heat stability. In some embodiments, tint is included in a layer, such as a functional layer or substrate layer. For example, a solution incorporating chromophores having desired chromatic properties can be applied to a functional hard coat layer that is porous. As a result, the hard coat layer can be impregnated with the chromophores. As another example, powdered dyes can be included with plastic pellets during the manufacture of the plastic. The compatible dyes can form a substantially uniform mixture with the plastic to form a tinted plastic material. In some embodiments, a tinted layer can be constructed such that chromophores can be a principal component of the layer or a smaller fraction of the tinted layer, according to the desired chromatic properties of the layer. The thickness of the layer can be adjusted to achieve a desired color profile of the lens.

Some embodiments provide for eyewear 100 having electrochromic functionality incorporated into the laminate 110. The eyewear 100 can include a power source, such as a battery, an electrical contact, and a conductor that conveys a voltage to an electrode in the electrochromic laminate. The eyewear 100 can include a user interface element integrated into the frame 104, the earstems 106, the lens 102, or any combination of these. The user interface element can be configured to allow the user to control activation and deactivation of the electrochromic layer. The user interface element can be a switch, button, toggle, slide, touch-interface element, knob, other mechanical feature, or other electrical feature. For example, the user interface element can include a touch-sensitive region where if a user contacts said region the electrochromic element changes state from dark to transparent. In some embodiments, a lens includes both photochromic and electrochromic layers, integrated into a single functional layer or implemented in separate functional layers.

An advantage of incorporating functional elements into the laminate 110 and/or lens body 108 is that it provides the ability to separately manufacture each functional lens element. Thus, elements can be made in parallel and assembled to make a lens 102 having desired functional qualities, thereby increasing manufacturing capabilities and/or lowering costs. In addition, multiple functional properties can be imparted to a lens using the techniques and lens elements described herein, providing flexibility and greater capacity for creating lenses 102 with varying characteristics.

Example Configurations of Lens Bodies and Laminates in Eyewear

The eyewear 100 can incorporate one or more lens bodies and one or more laminates in various configurations. Each lens body and each laminate can be configured to provide a variety of functions. Thus, a manufacturer, retailer, user, or the like can select functional layers in the lens bodies and laminates and/or the configuration of the lens bodies and laminates to provide desired functionality. Sample configurations of laminates and lens bodies are illustrated in FIGS. 1-4. Other variations and permutations of laminates and lens bodies are contemplated by the present disclosure as well.

FIGS. 1 and 1A illustrate an example embodiment of eyewear 100 having a laminate 110 attached to the convex side of a lens body 108. On the convex side of the lens body 108, the laminate can be configured to provide functionality suitable for that position. For example, it may be desirable that eyewear 100 have a flash mirror coating on the exterior side of the lenses 102a, 102b. This can be accomplished by attaching a laminate 110 that has a flash mirror coating incorporated therein. Where the laminate 110 is removable, positioning the laminate on the convex side of the lenses 102a, 102b may allow for easier application and removal of the laminate 110.

The laminate 110 positioned on the convex surface of the lens body 108 can provide the eyewear 100 with desirable attributes. For example, the laminate 110 can include a polarizing layer, anti-reflection coating, a photochromic layer, flash mirror, hard coat, chroma enhancement dyes, color enhancement elements, an electrochromic layer, contrast enhancement elements, a trichoic filter, a glass layer, a hybrid glass-plastic layer, a liquid-containing layer, an refractive index matching layer, or any combination of these. By incorporating these and other functionalities into the laminate 110, the lens body 108 can have a coating applied or functional layer deposited using vapor deposition without substantially altering the desirable functional attributes of the laminate 110. For example, the lens body 108 can be immersion or dip coated with a hydrophobic layer. The laminate 110 can have an anti-reflection coating applied and the laminate 110 can be joined to the lens body 108 after the application of the hydrophobic layer such that the resulting lens includes both the hydrophobic functionality and the anti-reflection functionality without substantially altering the functionality of either coating. In another example, the laminate 110 can include a flash mirror and one or more hard coats on either side of the laminate 110. The lens body 108 can include an anti-fog coating on the concave side of the lens body 108 and one or more hard coats on either side of the lens body 108. The flash mirror can be incorporated into the laminate 110 using vapor deposition techniques. The anti-fog coating can be incorporated into the lens body 108 using immersion process techniques. The laminate 110 can then be attached to the lens body 108 by way of an adhesion layer such that the flash mirror side of the laminate 110 forms the exterior side of the finished lens and the anti-fog coating of the lens body 108 forms the interior side of the finished lens. In some embodiments, the lens 102 can include a heated lens element that can provide anti-fog functionality. For example, an electrically conductive transparent film of indium tin oxide-based material, zinc oxide-based material, or another suitable conductive material with substantial transparency can be included in a lens element, and a voltage can be applied across it such that heat is generated. As another example, the lens element can include non-transparent filaments that heat when a voltage is applied across them, providing an anti-fog functionality.

Figure 2:
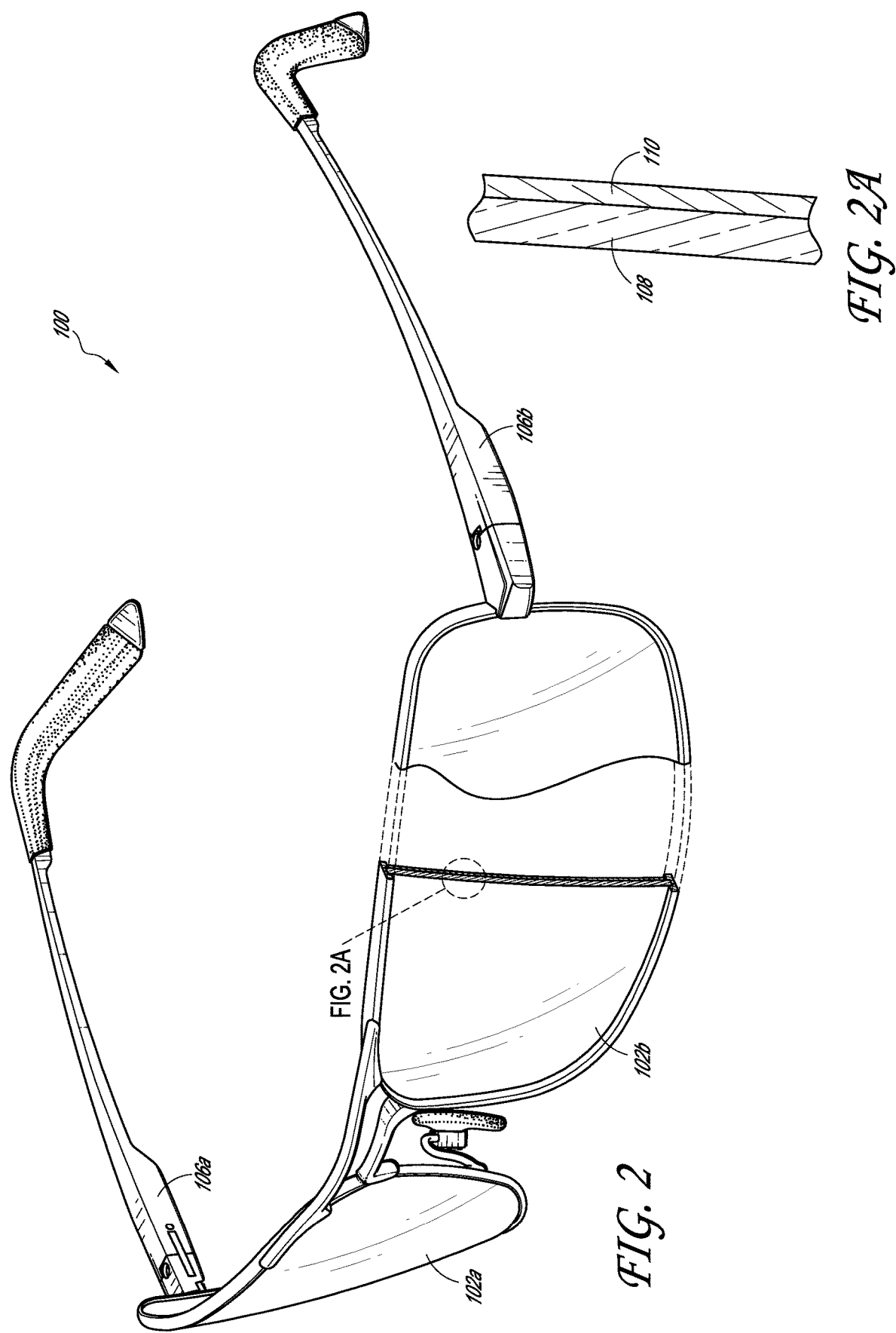

FIGS. 2 and 2A illustrate an example embodiment of eyewear 100 having a laminate 110 attached to the concave side of a lens body 108. Positioning the laminate 110 on the concave side of the lens body 108 allows for the incorporation of functionality that is desirable to be located on the interior of a lens. For example, in eyewear that forms an enclosure with the skin of the user, it may be advantageous to include an anti-fog coating on the interior side of a lens to reduce or prevent condensation on the lens caused by evaporating moisture in the enclosure. In sunglasses, it may be desirable to provide an anti-reflective coating to the interior side of a lens to reduce or prevent glare caused by light coming in from behind the user. In some embodiments, the lenses 102a, 102b are semi-finished and functionality is desirable on the concave surface so the convex surface can be processed, machined, or grinded without substantially altering the functional properties of the lenses 102a, 102b. Attaching the laminate 110 to the concave side of the lens body 108 can better protect the laminate 110 from scratches or other damage because generally the concave side of the lens 102a or 102b is better protected (e.g., by the concave shape of the lens or by the earstems of the eyewear).

Figure 3:
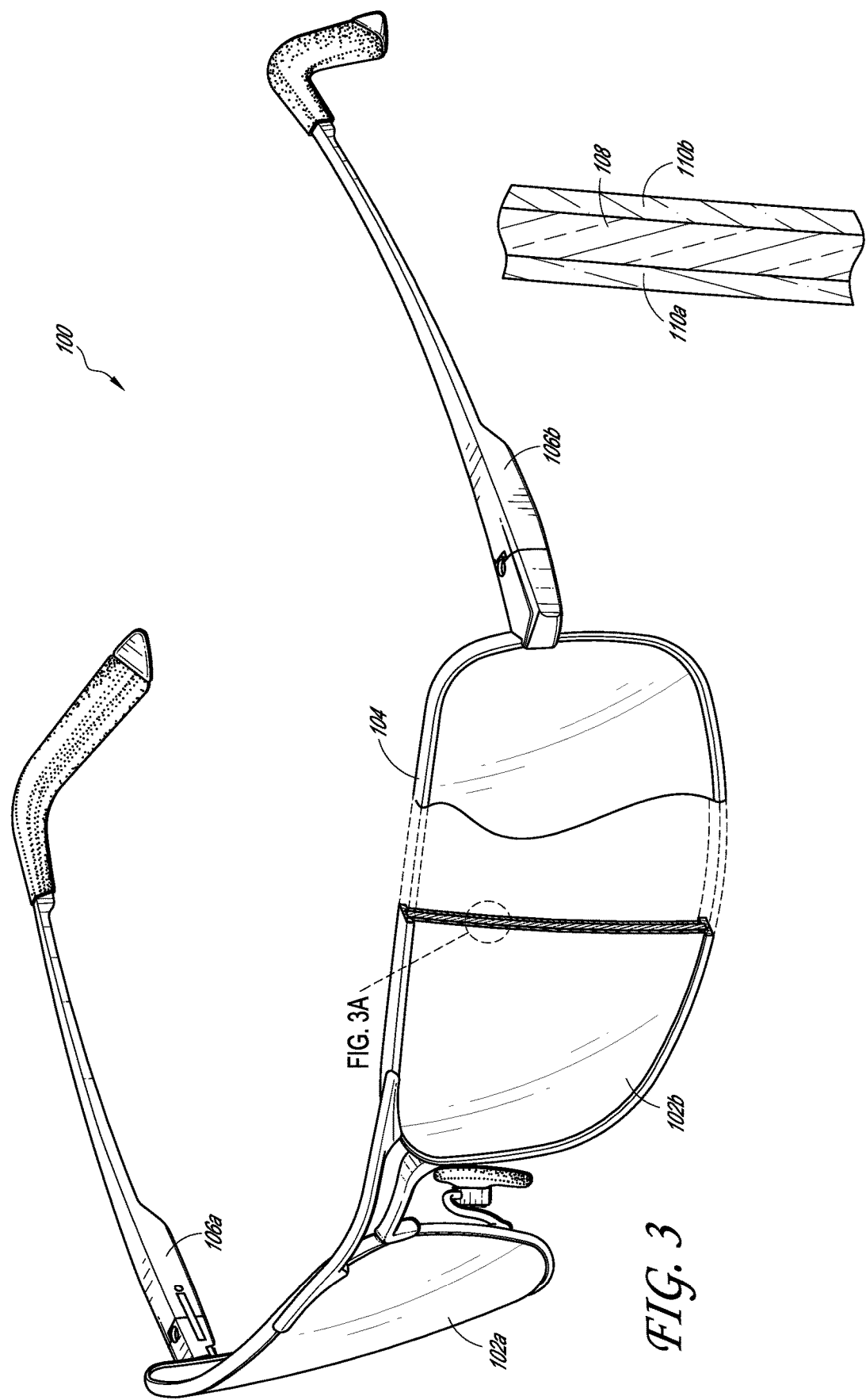

FIGS. 3 and 3A illustrate an example embodiment of an eyewear 100 having laminates 110a, 110b attached to convex and concave sides of a lens body 108. In some embodiments, the lens body 108 does not contain functional elements as described above. The functional qualities of the finished lens, then, arise due to the presence of the laminates 110a, 110b. This configuration allows for the production of "generic" lens bodies that are later infused with functionality from the association with one or more laminates. For example, the lens body 108 can be a polycarbonate lens that does not have any other functional element included therein. In this scenario, an anti-fog coating can be applied to the concave side of the lens body 108 through the use of laminate 110b. Additionally, an anti-reflective coating can be applied to the convex side of the lens body 108 through the use of laminate 110a. Thus, the lenses 102a, 102b can include an anti-fog coating and an anti-reflection coating on the lens body 108 through laminates 110a, 110b. In some embodiments, the lens body 108 includes functional aspects and the laminates 110a, 110b include additional and/or complementary functional aspects. For example, the lens body 108 can include a hard coat on one or both sides and a polarizing film. The laminate 110a can include one or more chroma enhancing dyes. The laminate 110b can include a hydrophobic layer, anti-static layer, or a photochromic layer.

Figure 4:
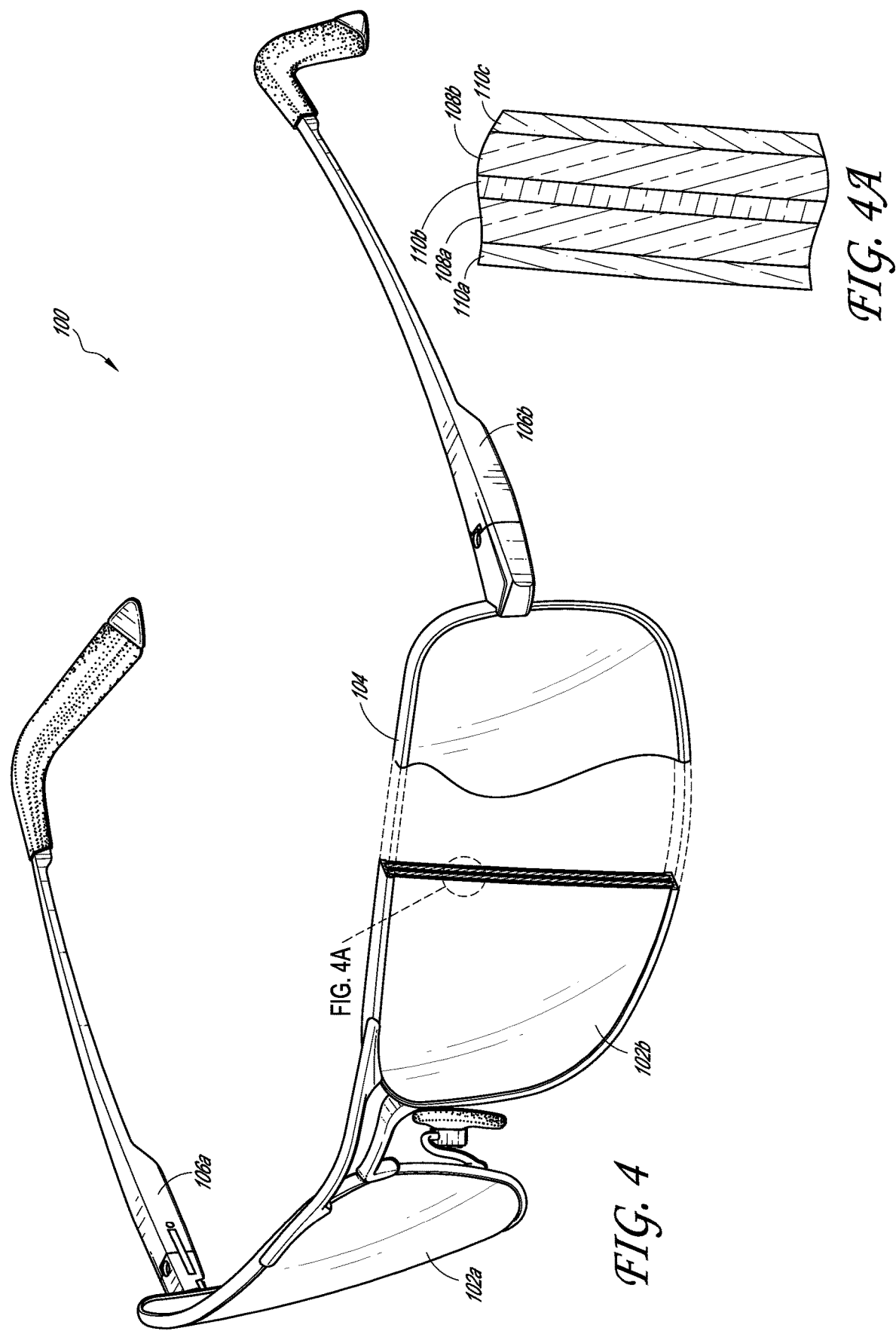

FIGS. 4 and 4A illustrate an example embodiment of eyewear 100 having laminates 110a, 110b, 110c attached to lens bodies 108a, 108b. The laminate 110b, sandwiched between lens bodies 108a and 108b, can be used to incorporate functionality into unfinished lenses 102a, 102b. For example, laminate 110b can include functional aspects that are desirable to include in a finished lens, such as polarization, photochromism, electrochromism, color enhancement, contrast enhancement, tinting, or chroma enhancement. The lens bodies 108a, 108b can be attached to either side of the laminate 110b to form an unfinished lens. The lens can be then shaped, machined, coated, grinded, and/or processed without substantially altering the functional aspects of the laminate 110b. Laminates 110a and 110c can be attached after processing the lens bodies 108a, 108b to create a lens with the desired qualities.

Example Lens Having a Lens Body, Adhesion Layers, and Laminates

Figure 5:
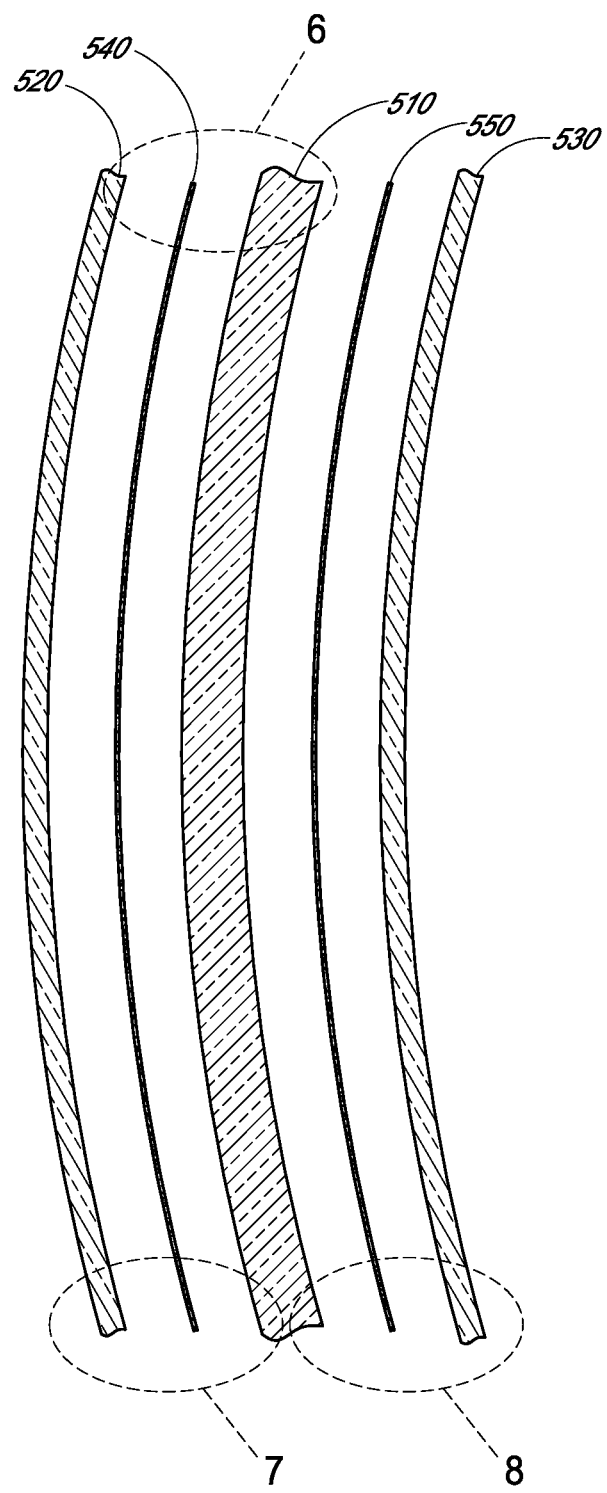
FIG. 5 shows an exploded view of some embodiments of a lens having a lens body and one or more laminates.

FIG. 5 illustrates an exploded view of a lens 500 having a lens body 510, a frontside laminate 520, a backside laminate 530, a frontside adhesion layer 540, and a backside adhesion layer 550. It should be noted that the thicknesses and relative thicknesses of the various lens elements are not drawn to scale but are drawn to more easily illustrate certain aspects of the lens 500. Portions of FIG. 5 delineated by the dotted ovals 6-8 indicate areas that are illustrated in greater detail in corresponding FIGS. 6-8.

Figure 6:
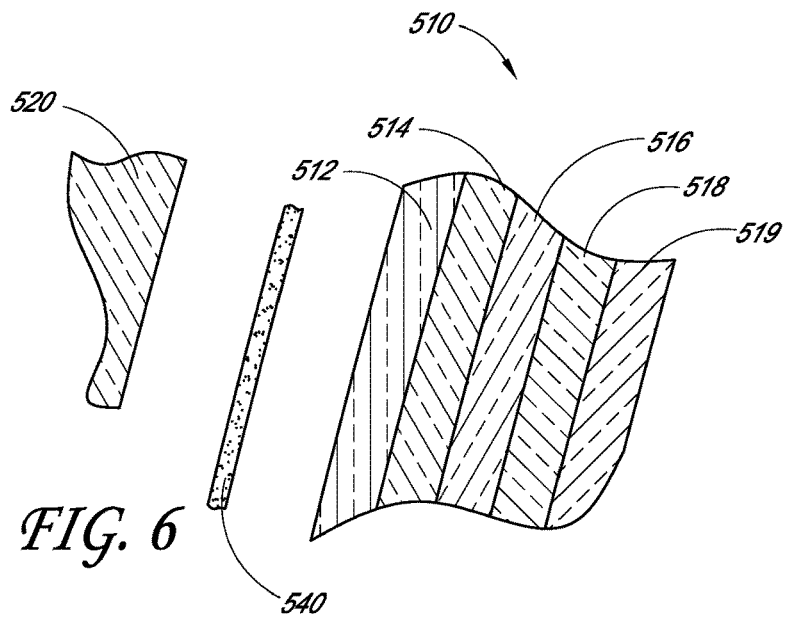
FIG. 6 shows a detailed view of the distal laminate of FIG. 5 according to some embodiments.

FIG. 6 illustrates a detailed view of the lens body 510, the frontside adhesion layer 540, and a portion of the frontside laminate 520. The lens body can include a substrate layer 516 that can include a layer of, for example, polycarbonate, nylon, polyurethane, polyethylene, polyimide, PET, BoPET, acrylic, glass, clear glass, doped glass, filter glass, or any combination of these. The substrate layer 516 can have a thickness greater than or equal to about 0.02" and/or less than or equal to about 0.1". The thickness of the lens body 510 can increase with the addition of the interface layers 514, 518 and the functional layers 512, 519. The substrate layer 516 can be configured to provide or not provide optical correction. As more fully described herein, the lens body 510 can have a variety of shapes and can provide the foundation for the final shape of the lens 500.

The first and second interface layers 514, 518 can include a hard coat layer, index matching layers, or an anti-fog layer. In some embodiments, there are no interface layers in the lens body 510. The first interface layer 514 and the second interface layer 518 can be formed of any material(s) suitable for providing hardness, abrasion resistance, and/or chemical resistance to the lens body 510, especially if the material compatibility requirement is met. In some embodiments, the first interface layer 514 and the second interface layer 518 can be formed of any material(s) suitable for providing interference properties, anti-reflection properties, improved adhesion with other lens elements, and/or providing a desirable index of refraction between the air and the laminate 520 or 530 and/or the laminate 520 or 530 and the lens body 510. The first interface layer 514 and the second interface layer 518 can be situated in between any layer in the laminate 506 or lens body 510 such as between the first functional layer 512 and the substrate layer 516. In some embodiments, the first interface layer 514 or the second interface layer 518 can be situated between the substrate layer 516 and the first and second functional layers 512 and 519.

As an example, the first interface layer 514 can have one or more index matching layers applied to improve the optical quality of the lens 500. As another example, the lens body substrate 516 can have a hard coat applied to it. The hard coat can be used to increase the durability, scratch resistance, and/or chemical resistance of the polymers or coatings onto which they are deposited and can provide similar functionality, in addition to improving adhesion or bonding, to coatings applied on top of the hard coat. For example, a base polymer treated with a polysiloxane hard coat can improve adhesion for a coating applied on top of the hard coat, such as an anti-reflective coating. The polysiloxane base coat can also improve the durability and longevity of the top coating. This can be achieved where the polysiloxane base coat hardens the base polymer and the top coating becomes hardier as a result, displaying more abrasion resistance than when the top coat is applied directly to the base polymer. To apply a hard coat, the lens body substrate 516 can be dipped in a polysiloxane material which can then be cured thermally. The thermally cured hard coat can be harder and more resistant to scratching or smudging than UV curable hard coats. The hard coat can be thermally cured at a temperature of greater than or equal to about 115° F., and/or less than or equal to about 260° F., for a period of time on the order of 2½ hours for high temperature to about 8 hours for low temperature curing although values outside these ranges may also be used in some embodiments. The hard coat can be thermally cured before other functional elements are applied so that they are not exposed to the heat used for curing the hard coat. In some embodiments, a hard coat on one or more lens elements can include a sol-gel material. For example, a hard coat can include a mixture of organic and inorganic materials, such as 40 nm diameter inorganic mineral oxide particles suspended in a matrix of organic composition, such as organic and silicon chains. In certain embodiments, polycarbonate lens elements are coated with sol-gel hard coats. Other suitable hard coat materials can be used depending on the composition of the lens elements. Many variations are possible.

In some embodiments, the second interface layer 518 can have an anti-fog or hydrophobic coating applied using an acceptable technique, such as those described herein above. In these embodiments, the lens 500 can exclude the backside laminate 530 and backside adhesion layer 550 such that the anti-fog layer includes the interior surface of the lens 500. The hydrophobic coating can include, for example, sol-gel coatings using alkoxides or pre-hydrolyzed solutions, a hydrophobic acting perfluoroalkysilane, a fluorinated organosilane material, metal oxides, metal fluorides, another material or substance providing hydrophobic properties, or any combination of these.

The first and second functional layers 512, 519 can include an interference stack, a flash mirror, photochromic layer(s), electrochromic layer(s), anti-reflective coating, anti-static coating, liquid containing layer, polarizing elements, chroma enhancing dyes, color enhancing elements, contrast enhancing elements, trichoic filters, or any combination of these. The functional layers 512, 519 can include one or more sub-layers thereby incorporating one or more functions into the lens body.

In some embodiments, the functional layer 512 or 519 is configured to provide variable light attenuation. For example, the functional layer 512 or 519 can include photochromic compositions that darken in bright light and fade in lower light environments. Such compositions can include, for example, but without limitation, silver, copper, and cadmium halides. Photochromic compounds for lenses are disclosed in U.S. Pat. Nos. 6,312,811, 5,658,502, 4,537,612, each of which are hereby expressly incorporated in its entirety herein by reference. A lens 500 incorporating one or more photochromic functional layers would thus provide relatively little light attenuation when used in a lower light environment, but would automatically provide increased light attenuation when used in bright light, such as when worn outdoors. Thus, in some embodiments, the lens 500 can be suitable for use in both indoor and outdoor environments.

In some embodiments, functional layer 512 or 519 is an electrochromic layer which can include a dichroic dye guest-host device configured to provide variable light attenuation. For example, functional layer 512 or 519 can include spaced substrates coated with a conducting layer, an alignment layer, and preferably a passivation layer. Disposed between the substrates is a guest-host solution which includes a host material and a light-absorbing dichroic dye guest. A power circuit can be supplied to the functional layer 512 or 519 through a battery in the host eyewear. The power circuit provides a supply of electrical power to the conducting layers. Adjustment of the power supply alters the orientation of the host material which in turn alters the orientation of the dichroic dye. Light is absorbed by the dichroic dye, depending upon its orientation, and thus provides variable light attenuation, that can be manually adjusted by the wearer. Such a dichroic dye guest-host device is disclosed in U.S. Pat. No. 6,239,778, which is hereby expressly incorporated herein by reference in its entirety.

In some embodiments, an electrochromic functional layer is produced by depositing a composition containing a crosslinkable polymer onto a suitable support followed by in situ crosslinking. For example, a polymerizable composition can be applied onto a glass plate coated with a layer of $WO_3$ and a tin oxide conductive sublayer, and photopolymerized by UV irradiation to obtain a membrane that is optically transparent in the visible range and adherent to the support. The membrane can then be assembled with a counterelectrode formed on a glass plate bearing a layer of hydrogenated iridium oxide $H_xIrO_2$ and a tin oxide sublayer. The polymerizable composition can be formed from the lithium salt of trifluoro-methanesulfonyl(1-acryloyl-2,2,2-tri-fluoroethanesulfonyl)imide, poly(theylene glycol) dimethacrylate, silica particles, and xanthone. In some embodiments, an electrochromic layer is formed by two electrochromic layers separated by a film of ion-conducting material. Each electrochromic layer can be borne by a substrate coated with a conductive oxide, an indium tin oxide-based material, a zinc oxide-based material, or another type of conductive layer. The ion-conducting material forms an ion-conducting polymer electrolyte and is formed by a proton-conducting polymer, for example a 2-acrylamido-2-methylpropanesulfonic acid homopolymer. The polymer film can be produced by depositing onto one of the electrodes a liquid reaction mixture containing the polymer precursor dissolved in a liquid solvent, for example a mixture of water and NMP. In some embodiments, an electrochromic layer includes an electrode and a counterelectrode separated by a solid polymer electrolyte, the electrode being formed by a transparent substrate bearing an electronically conductive film coated with a film of a cathode active material with electrochromic properties, the counterelectrode being formed by a transparent substrate bearing an electronically conductive film coated with a film of an anode active material with electrochromic properties, the electrolyte being formed by an ion-conducting material including a salt dissolved in a solvating solid polymer. The electrochromic layer can be characterized in that the electrolyte membrane is intercalated in the form of a composition of low viscosity free of volatile liquid solvent and including a polymer or a polymer precursor and a salt.

In some embodiments, the functional layer 512 or 519 has a filter that enhances chroma in a wavelength-conversion window, a background-window, a spectral-width window, another chroma enhancement window (CEW), or any combination of CEWs as disclosed in U.S. Patent Application Publication No. 2013/0141693, as known to one skilled in the art. The chroma-enhancing filter generally changes the colorfulness of a scene viewed through a lens 500 compared to a scene viewed through a lens with the same luminous transmittance but a different spectral transmittance profile. An optical filter can be configured to enhance the chroma profile of a scene when the scene is viewed through a lens that incorporates the optical filter. The optical filter can be configured to increase or decrease chroma in one or more chroma enhancement windows in order to achieve any desired effect. The chroma-enhancing optical filter can be configured to preferentially transmit or attenuate light in any desired chroma enhancement windows. Any suitable process can be used to determine the desired chroma enhancement windows. For example, the colors predominantly reflected or emitted in a selected environment can be measured, and a filter can be adapted to provide chroma enhancement in one or more spectral regions corresponding to the colors that are predominantly reflected or emitted. In some embodiments of the lens 500, the optical filter is partially incorporated into the lens body 510. In certain embodiments, the optical filter can be partially incorporated into the laminate 520 or 530. The functional layer 512 or 519 can include one or more chroma enhancement dyes configured to attenuate visible light passing through the lens 500 in one or more spectral bands. One skilled in the art would understand that attenuation properties of such chroma enhancement dyes are described in U.S. Patent Application Publication No. 2013/0141693, which is incorporated by reference herein. In some embodiments, one or more portions of the optical filter can be incorporated into the functional layers 512 and 519, into the lens body substrate 516, into an interface layer 514, 518, into an adhesive layer 540, 550, into another lens element, or into a combination of elements. For example, the functional layer 512 or 519 can be structured to include one or more chroma enhancement dyes that increase the chroma of a scene as compared to the chroma of a substantially unfiltered scene.

In some embodiments, the functional layer 512 or 519 includes a mirror coating configured to partially reflect light incident on the exterior side of the lens. This coating can be partially reflective and partially transmissive such that the user does not see the reflected light. For example, the substrate 516 can be treated with a metallic coating, such as chromium or aluminum, using a vacuum coating machine, thereby creating a functional layer that partially reflects and transmits light. In some embodiments, the mirror coating includes a dielectric, such as silicon oxide, to improve reflectance, to impart coloration to the lens, to impart resistance to abrasion to the coating, or any combination of these. In addition to providing a partially mirrored surface, the metallic coating can provide additional strength and durability to the lens body 510 or other lens element.

In some embodiments, the functional layer 512 or 519 includes an anti-reflective coating. An antireflective coating for a lens can have a number of different configurations. For example, an interference coating can have one or more thin layers that are configured to reduce reflections through destructive interference. In some configurations, an antireflective interference coating has multiple layers formed from alternating low-refractive index and high-refractive index materials. The coating can be deposited on the substrate 516 using vacuum deposition. In some embodiments, the interference coating can be formed by depositing each of the plurality of high-refractive index layers by contacting the substrate with a vapor phase pulse of one or more high-refractive index source chemicals while simultaneously contacting the substrate with an energetic ion beam, such that each of the deposited plurality of high-refractive index layers can include a substantially fully oxidized metal oxide thin film. The one or more high-refractive index source chemicals can include at least one of zirconium dioxide, niobium oxide, titanium dioxide, tantalum pentoxide, cerium oxide, or hafnium oxide. In some embodiments, each of the plurality of low-refractive index layers can be deposited by contacting the substrate with a vapor phase pulse of one or more low-refractive index source chemicals, such that the deposited plurality of low-refractive index layers are arranged in an alternating relationship with the deposited plurality of high-refractive index layers. The one or more low-refractive index source chemicals can include silica, such as silicon dioxide.

The thicknesses of the plurality of high-refractive index layers and the plurality of low-refractive index layers can be selected such that, when the multilayer interference coating is deposited on a surface of an ophthalmic lens, a desired luminous reflectance at the surface of the ophthalmic lens is achieved. In some embodiments, the material system of an antireflective stack is free or mostly free of materials that absorb any substantial portion of visible light. In certain embodiments, the luminous transmittance of a clear polycarbonate lens coated with an antireflective stack described herein is greater than or equal to about 97%, greater than or equal to about 97.5%, about 98%, or greater than or equal to about 98%. In some embodiments, the luminous reflectance of the coated lens is less than about 4%, less than about 3%, less than about 2.5%, or less than about 2%. The disclosed coatings can be applied to the convex surface, the concave surface, or both the convex and concave surfaces of a lens. In certain embodiments, the luminous reflectance of a coated surface of a lens is less than about 2%, less than about 1.5%, less than about 1%, or less than about 0.5%. As used herein, luminous transmittance and luminous reflectance can be measured with respect to a standard daylight illuminant, such as CIE illuminant $D_{65}$. In certain embodiments, each of the plurality of low refractive index layers is deposited without using ion beam assisted deposition.

In some embodiments, the functional layer 512 or 519 includes a polarizer. For example, a polarizer can include a polycarbonate sheet, a polymeric film, and a polarizing thin layer. The polymeric film can include a polyvinyl alcohol (PVA) film, polyvinylformal film, polyvinylacetal film, and a saponified copolymer film. The polymeric film can include a dichroic substance or iodine, which can be adsorbed on the film and oriented to substantially block light having a certain polarization. The polycarbonate sheet can be bonded to the polymeric film using a transparent adhesive, for example, an acrylic adhesive, epoxy type adhesive, or urethane type adhesive such as a polyurethane adhesive. In some embodiments, the polarizing element can include two polycarbonate sheets on either side of a PVA film. In some embodiments, the functional layer 512 can include a PVA film treated with a dichroic substance or iodine. In some embodiments, the laminate 520 includes a polarizing laminate which includes a PVA film and one or more polycarbonate sheets bonded together using a polyurethane adhesive. Examples of such polarizing elements are disclosed in U.S. Pat. No. 5,051,301 to Kawaki et al., which is hereby incorporated herein by reference in its entirety. In some embodiments, thermally cured adhesives are used in conjunction with polarizing elements. As described herein, incorporating functional elements into a laminate can thermally insulate and/or thermally isolate the elements during manufacture. Iodine dyes, which typically have a higher polarization efficiency compared to dichroic dyes, typically have a lower thermal stability making them less desirable for use with lenses manufactured using high temperatures. A polarizing filter including an iodine dye can be incorporated into a laminate 510 or 530, however, without substantially degrading the dyes due to exposure to high temperatures, thereby providing the higher efficiency polarizing dye in a lens 500.

The frontside adhesion layer 540 can include an adhesive layer that is thermally or UV cured, a pressure sensitive adhesive, or the lens elements can be joined through electrostatic adhesion. The frontside adhesion layer 540 can be configured to join the frontside laminate 520 and the lens body 510. Methods and materials suitable for bonding the lens body 510 to the frontside laminate 520 can be used to facilitate adhesion between two or more lens elements. Examples of bonding technologies that may be suitable include thermal welding, fusing, pressure sensitive adhesives, polyurethane adhesives, electrostatic attraction, thermoforming, other types of adhesives, materials curable by ultraviolet light, thermally curable materials, radiation-curable materials, other bonding methods, other bonding materials, and combinations of methods and/or materials. In some embodiments, a pressure sensitive adhesive can be used in the frontside adhesion layer 540 and can be rolled, sprayed, or otherwise applied to a surface so that it is disposed between the lens body 510 and the frontside laminate 520. Materials suitable for use as the frontside adhesion layer 540 can be selected to have good optical properties, including high optical transparencies, no yellowing upon exposure to sunlight, an ability to flex during injection molding without becoming crazed, minimal shrinkage during curing, and the like. The materials used for the frontside adhesion layer 540 can be curable by thermal treatment or by treatment with ultraviolet light. In some embodiments, the adhesion layers 540, 550 can be used to index match materials in the lens 500.

In some embodiments, the adhesion layers 540, 550 incorporate one or more chroma enhancement dyes. For example, the one or more chroma enhancement dyes can be added to a container of the bonding material, and the mixture can be stirred or otherwise agitated until the dyes are substantially, almost completely, or completely dissolved into the bonding material. The bonding material can then be applied between two or more lens components, thereby promoting adhesion between the components and adding at least a portion of a chroma enhancement filter to the composite lens structure.

Figure 7:
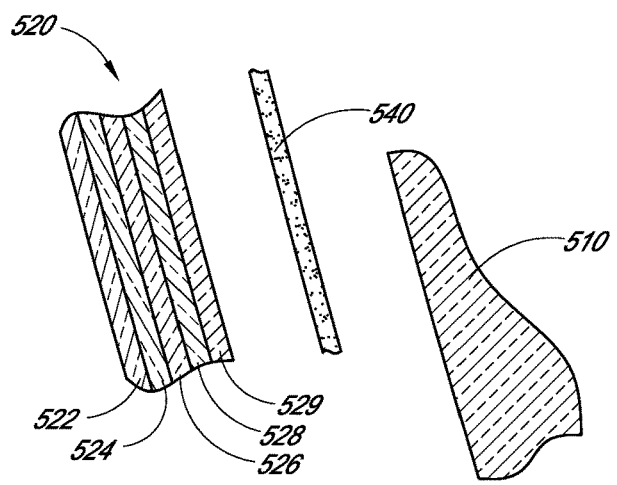
FIG. 7 shows a detailed view of the lens body of FIG. 5 according to some embodiments.

FIG. 7 illustrates a detailed view of the frontside laminate 520. FIG. 7 also includes frontside adhesion layer 540 and a portion of the lens body 510. As depicted in FIG. 7, a lens 500 can include a frontside laminate 520 and a lens body 510 attached to one another by way of an adhesion layer 540.

The laminate 520 can include a substrate layer 526. The substrate layer 526 can include a layer of, for example, polycarbonate, nylon, polyurethane, polyethylene, polyimide, PET, BoPET, acrylic, or any combination of these. The substrate layer 516 can have a thickness greater than or equal to about 0.002" and/or less than or equal to about 0.01". The thickness of the laminate 520 can increase with the addition of interface layers 524, 528 and functional layers 522, 529. In some embodiments, the substrate layer 526 can be configured to be malleable such that it can conform to the surface of a lens body 510 when adhered thereto.

The laminate 520 can include first and second interface layers 524, 528 such that the substrate layer 526 is sandwiched between the interface layers 524, 528. The properties and characteristics of the interface layers 524, 528 on the laminate 520 are similar to the interface layers 514, 518 of the lens body 510 described herein above with reference to FIG. 6. In some embodiments, the interface layers 524, 528 are configured to maintain the malleability of the laminate 520. In some embodiments, the laminate is substantially permanently affixed to the lens body 510, reducing or eliminating the desire to maintain the flexibility of the laminate 520.

The laminate 520 can also include first and second functional layers 522, 529 positioned adjacent to the first and second interface layers 524, 528. The functional layers 522, 529 have similar properties and characteristics to the functional layers 512, 519 of the lens body 510 described herein above with reference to FIG. 6.

In some embodiments, the laminate 520 of FIG. 7 is a polarizing wafer. The polarizing wafer can be similar in many respects to polarizing wafers available from, for example, Mitsubishi Gas Chemical Company, Inc. of Tokyo, Japan and Sumitomo Bakelite Co., Ltd. of Tokyo, Japan. The polarizing wafer can at least partially incorporate an optical filter designed to provide chroma enhancement in one or more portions of the visible spectrum. In some embodiments of the polarizing wafer, the substrate layer 526 includes a clear, stretched polycarbonate sheet having a thickness ranging from about 0.03 mm to about 4 mm, or a thickness ranging from about 0.05 mm to about 3 mm. In some embodiments, the first and second interface layers 524, 528 include polyurethane adhesives. In certain embodiments, the laminate 520 can provide polarizing properties by incorporating one or more dichroic dyes, iodine, or other suitable dyes into a polyvinyl alcohol-type film having a thickness ranging from about 20 µm to about 120 µm, or ranging from about 30 µm to about 50 µm. Examples of a polyvinyl alcohol-type film are a polyvinyl alcohol (PVA) film, a polyvinylformal film, a polyvinylacetal film and a saponified (ethylene/vinyl acetate) copolymer film. In some embodiments, the polarizing properties of the wafer can be provided by a nano-wire grid which filters light through plasmon reflection. In certain embodiments, the polarizing wafer can be coated with one or more coatings to provide added functionality. In some embodiments, the PVA film of the polarizing wafer can be coated with polyurethane or other suitable adhesives.

Figure 8:
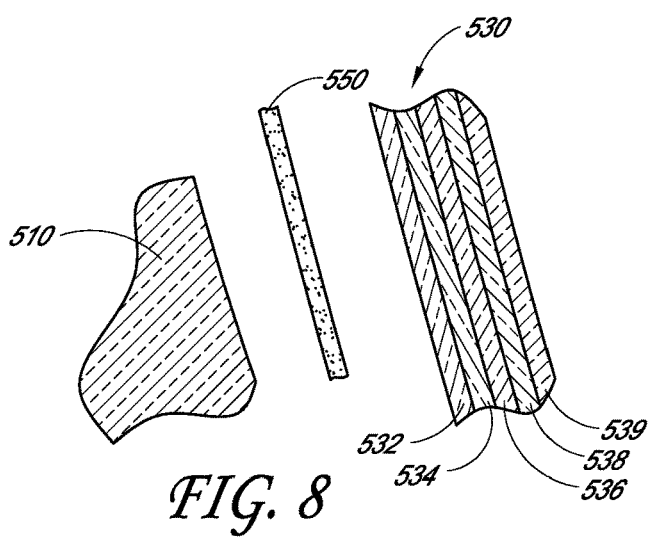
FIG. 8 shows a detailed view of the proximal laminate of FIG. 5 according to some embodiments.

FIG. 8 illustrates a detailed view of the backside laminate 530 and the backside adhesion layer 540. FIG. 8 also includes a portion of the lens body 510. The properties of the backside laminate 530 are similar to those of the frontside laminate 520. For example, the backside laminate 530 includes a substrate layer 536, first and second interface layers 534, 538, and first and second functional layers 532, 539. The properties of the substrate layer 536, the interface layers 534, 538, and the functional layers 532, 539 are similar to those described herein above with reference to the frontside laminate 520 illustrated in FIG. 7.

Certain layers shown in the embodiments illustrated in FIGS. 6-7 can be omitted. For example, in some cases, interface layers are not used in the lens body 510 and/or the laminates 520, 530. As another example, one or both of the functional layers 532, 539 in the backside laminate 530 can be omitted. In such a scenario, one or both of the interface layers 534, 538 can be configured to provide functionality to the lens 500 by incorporating index matching layers, hard coat layers, and/or anti-fog layers. In some embodiments, the lens body 510 does not include interface layers 514, 518 and/or functional layers 512, 519. In these embodiments, the lens 500 can incorporate the frontside laminate 520 and/or the backside laminate 530 to impart desired functionality to the lens. In some embodiments, the frontside laminate 520 does not include a first or second functional layer 522 or 529 and/or interface layers 524, 528.

Functional layers may include sub-layers that are not specifically shown in FIGS. 6, 7, and 8, where "layer" and "sub-layer" are used in their broad and ordinary sense. For example, a layer or sub-layer can be a substantially contiguous film deposited from a single coating material or a single group of coating materials. In some embodiments, an antireflective coating can be applied to the front and/or back surfaces of the laminates 520, 530, and/or lens body 510. Also, in some embodiments, a hard coat layer or other protective layer can be formed on the front surface of the lens body 510 or laminates 520, 530 so as to protect the underlying functional layers or interface layers from scratches or other damage. In some embodiments, the functional layers in the laminates 520, 530 or lens body 510 can include a coating of cellulose triacetate (TAC) or other coating on its front and/or back surfaces.

Table 1 summarizes the various materials, coatings, films, or layers that can be used at the various positions described herein and illustrated in FIGS. 5-8.

TABLE 1

Example lens layer options

| Lens Element Thickness | Position | Material, Function, Film, Coating, Layer |
|---|---|---|
| Frontside Laminate 0.002"-0.010" thick | Functional Layer | Interference Stack, Flash Mirror, Photochromic Layer(s), Anti-Reflective, Anti-Static, Liquid Containing Layer(s), Electrochromic Layer(s), Chroma Enhancement, Color Enhancement, Contrast Enhancement, Trichoic Filter, Glass Layer, Hybrid Glass-Plastic Layer |
| | Interface Layer | Hard coat Layer(s), Nothing |
| | Substrate Layer | PC, Nylon, Polyurethane, Polyethylene, Polyimide, PET, acrylic, MYLAR ®, clear glass, doped glass, filtered glass |
| | Interface Layer | Hard coat Layer(s), Index Matching Layer(s), Nothing |
| | Functional Layer | Interference Stack, Flash Mirror, Photochromic Layer(s), Anti-Reflective, Anti-Static, Liquid Containing Layer(s), Electrochromic Layer(s), Chroma Enhancement, Color Enhancement, Contrast Enhancement, Trichoic Filter, Glass Layer, Hybrid Glass-Plastic Layer, Nothing |
| Adhesion Options | Adhesion Layer | Adhesive Layer (Thermal or UV cured), Electrostatic Adhesion, Pressure Sensitive Adhesive |
| Lens Body 0.02"-0.10" thick with or without optical correction | Functional Layer | Interference Stack, Flash Mirror, Photochromic Layer(s), Anti-Reflective, Anti-Static, Liquid Containing Layer(s), Electrochromic Layer(s), Chroma Enhancement, Color Enhancement, Contrast Enhancement, Trichoic Filter, Glass Layer, Hybrid Glass-Plastic Layer, Nothing |
| | Interface Layer | Hard coat Layer(s), Index Matching Layer(s), Nothing |
| | Substrate Layer | PC, Nylon, Polyurethane, Polyethylene, Polyimide, PET, acrylic, MYLAR ®, clear glass, doped glass, filtered glass |
| | Interface Layer | Hard coat Layer(s), Anti-Fog Layer, Index Matching Layer(s), Nothing |

TABLE 1-continued

Example lens layer options

| Lens Element Thickness | Position | Material, Function, Film, Coating, Layer |
|---|---|---|
| | Functional Layer | Interference Stack, Flash Mirror, Photochromic Layer(s), Anti-Reflective, Anti-Static, Liquid Containing Layer(s), Electrochromic Layer(s), Chroma Enhancement, Color Enhancement, Contrast Enhancement, Trichoic Filter, Glass Layer, Hybrid Glass-Plastic Layer, Nothing |
| Adhesion Options | Adhesion Layer | Adhesive Layer (Thermal or UV cured), Electrostatic Adhesion, Pressure Sensitive Adhesive |
| Backside Laminate 0.002"-0.010" thick | Functional Layer | Interference Stack, Flash Mirror, Photochromic Layer(s), Anti-Reflective, Anti-Static, Liquid Containing Layer(s), Electrochromic Layer(s), Chroma Enhancement, Color Enhancement, Contrast Enhancement, Trichoic Filter, Glass Layer, Hybrid Glass-Plastic Layer, Nothing |
| | Interface Layer | Hard coat Layer(s), Nothing |
| | Substrate Layer | PC, Nylon, Polyurethane, Polyethylene, Polyimide, PET, acrylic, MYLAR ®, clear glass, doped glass, filtered glass |
| | Interface Layer | Hard coat Layer(s), Anti-Fog Layer, Nothing |
| | Functional Layer | Interference Stack, Flash Mirror, Photochromic Layer(s), Anti-Reflective, Anti-Static, Liquid Containing Layer(s), Electrochromic Layer(s), Chroma Enhancement, Color Enhancement, Contrast Enhancement, Trichoic Filter, Glass Layer, Hybrid Glass-Plastic Layer, Nothing |

Example 1

In example embodiment 1, a lens 500 includes a lens body 510 configured to provide optical correction. The lens body 510 includes a substrate layer 516 including polycarbonate having a thickness of about 0.1". In addition, the lens body 510 includes an anti-fog layer 518 disposed on the concave surface of the substrate 516. The anti-fog layer can be applied using a suitable immersion process, as described herein. The lens 500 also includes a frontside laminate 520 disposed on the convex surface of the lens body 510 and attached thereto using thermally-curable adhesion layer 540. The laminate 520 includes a substrate layer 526 including a thermoplastic polymer resin PET having a thickness of about 0.02". The laminate 520 also includes hard coat layers 524, 528 disposed on the convex and concave surfaces of the laminate substrate 526, respectively. The laminate 520 also includes a flash mirror film 522 disposed on the convex surface of the hard coat layer 524.

Example 2

Example embodiment 2 has the same general structure as example embodiment 1 except that the flash mirror layer 522 is replaced with an interference stack 522 disposed on the convex surface of the hard coat 524. The interference stack can be applied to the laminate 520 through the use of vacuum deposition techniques.

Example 3

Example embodiment 3 has the same general structure as example embodiment 1 and includes a hard coat layer 514 disposed on the convex surface of the substrate 516, adjacent to the adhesion layer 540.

Example 4

In example embodiment 4, a lens 500 includes a lens body 510. The lens body 510 includes a substrate layer 516 including glass. The lens body 510 also includes an anti-fog layer 519 disposed on the concave surface of the substrate layer 516. The lens 500 includes a frontside laminate 520 disposed on the convex surface of the lens body 510 and attached thereto through adhesion layer 540. The laminate 520 includes substrate layer 526 including polyurethane. The laminate 520 also includes a reflective interference coating 522 disposed on the convex surface of the laminate substrate 526.

Example 5

Example embodiment 5 has the same general structure as example embodiment 4 and includes a hard coat 524 disposed on the convex surface of the laminate substrate 526, between the substrate 526 and the interference coating 522.

Example 6

Example embodiment 6 has the same general structure as example embodiment 4 and includes a hard coat 528 disposed on the concave surface of the laminate substrate 526, adjacent to the adhesion layer 540.

Example 7

Example embodiment 7 has the same general structure as example embodiment 4 and includes a polarizer within or as the substrate layer 526. For example, the laminate substrate layer 526 can include a polycarbonate sheet and a PVA film treated to polarize transmitted light. As another example, the laminate substrate 526 can include a PVA film treated with a dichroic substance or iodine to become a polarizing film.

Example 8

Example embodiment 8 has the same general structure as example embodiment 4 and includes a hard coat 518 disposed on the concave surface of the lens body 510 between the lens body substrate 516 and the anti-fog functional layer 519.

Example 9

In some example embodiments, a lens 500 includes a lens body 510 and a frontside laminate 520. The lens body 510 includes a substrate layer 516 including polyethylene. The lens 500 includes laminate 520 that is disposed on the convex surface of the lens body 510 and is attached thereto through electrostatic adhesion. The laminate 520 includes a substrate layer 526 including acrylic. The laminate 520 also includes a photochromic layer 522 disposed on the convex surface of the laminate substrate 526.

Example 10

Example embodiment 10 has the same general structure as example embodiment 9 and includes a hard coat 518 disposed on the concave surface of the lens body 510.

Example 11

Example embodiment 11 has the same general structure as example embodiment 9 and includes a hard coat 514 disposed on the convex surface of the lens body substrate 516, adjacent to the laminate substrate 526.

Example 12

Example embodiment 12 has the same general structure as example embodiments 9 or 10 and includes an anti-fog layer 518 or 519 disposed on the concave surface of the lens body 510, either on the substrate 516 or hard coat 518, if included.

Example 13

Example embodiment 13 has the same general structure as example embodiment 9 and includes a primer or adhesion layer 524 disposed on the convex surface of the laminate substrate 526, between the substrate 526 and the photochromic layer 522. The primer or adhesion layer 524 can be configured to facilitate the bonding of the photochromic layer 522 to the laminate substrate 526.

Example 14

In example embodiment 14, a lens 500 includes a lens body 510 having a substrate layer 516 including polycarbonate. The lens 500 also includes a laminate 530 disposed on the concave surface of the lens body substrate 516. The laminate 530 includes a laminate substrate 536 including MYLAR® disposed on the concave surface of the lens body substrate 516 and attached thereto through adhesion layer 550. The backside laminate 530 also includes an anti-fog layer 538 disposed on the concave surface of the laminate substrate 536. The backside adhesion layer 550 can include a thermally-curable adhesive. The lens also includes a laminate 520 disposed on the convex surface of the lens body 510 and attached thereto using a pressure sensitive adhesive 540. The laminate 520 can incorporate any functionality described herein. For example, the laminate 520 can include a substrate layer 526 including nylon. The laminate 520 can also include a chroma enhancement layer 512 disposed on the convex surface of the substrate layer 526.

Example 15

Example embodiment 15 has the same general structure as example embodiment 14 except the backside laminate substrate 536 includes polycarbonate.

Example 16

Example embodiment 16 has the same general structure as example embodiment 14 and includes a hard coat layer 514 disposed on the convex surface of the lens body substrate 516 and disposed between the substrate 516 and the adhesion layer 540.

Example Transition Layers

In some embodiments, the adhesion layers 540, 550 can act as transition layers between laminate substrates 526, 536 and the lens body substrate 516. The transition layers 540, 550 can include multiple layers which can provide functionality to the lens 500. For example, transition layers 540, 550 can include coatings, films, adhesives, laminates, or any combination of these. The transition layers 540, 550 can be selected based on the composition of the laminate substrates 526, 536 and the lens body substrate 516. For example, the transition layers 540, 550 can be configured to provide index matching between the laminate substrates 526, 536 and the lens body substrate 516. The transition layers 540, 550 can provide desirable functionality, including, for example, assisting in matching the optical index of the lens body 510 and functional layers 520, 530; providing optical properties to the lens; providing mechanical or chemical durability to the lens; improving adhesion between the functional layers and the lens body; improving other properties of the lens; or any combination of these. In some embodiments, the transition layers 540, 550 can facilitate an attachment between a laminate 520, 530 and the lens body 510.

Example Goggles Incorporating Functional Laminates

Figure 9:
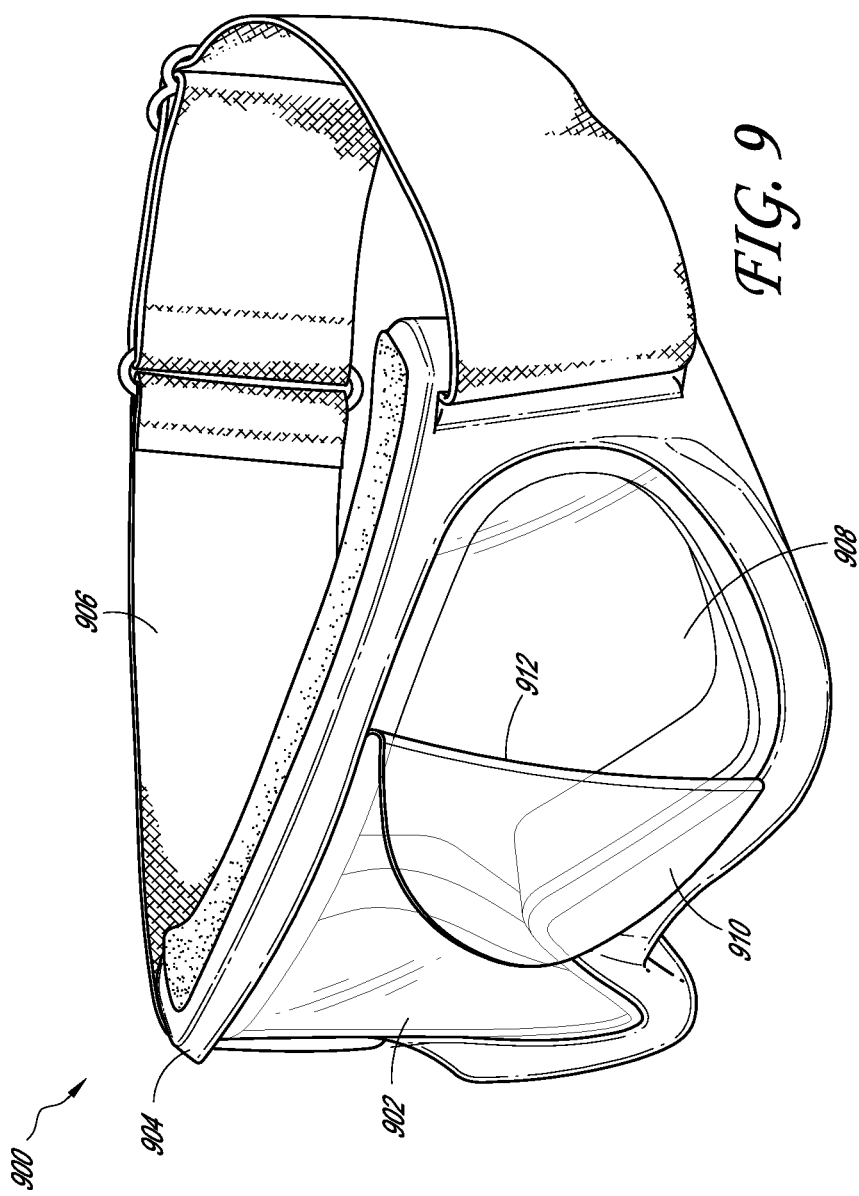
FIG. 9 shows a perspective view of some embodiments of a pair of goggles having a removable laminate attached to a convex surface of a lens body.

FIG. 9 is a perspective view of some embodiments of eyewear 900 having a removable laminate 910. The laminate 910 can be configured to be attachable and removable by a user, retailer, optical technician, or the like based at least in part on the pliability of the laminate 910 and/or the bonding strength between the laminate 910 and a lens body 908. The laminate 910 can be attachable to the convex side of the lens body 908, the concave side of the lens body 908, or both sides of the lens body 908. In some embodiments, the laminate 910 is not the same size as the lens body 908; it can be larger, smaller, or approximately the same size as the lens body 908.

The eyewear 900 includes a lens 902. The lens 902 is configured to extend in the path of a wearer's left and right eye fields of vision. As shown in FIG. 9, the curvature of the lens 902 permits it to conform closely from side to side to the wearer's face, thus maximizing the interception of sun and other strong light sources, while at the same time providing comfort and pleasing aesthetic characteristics.

The lens 902 can be of a single pane of material. Thus, the lens 902 can be unitary or have a dual lens design. A nosepiece opening can be formed along the lower edge of a frame 904, which can be sized and configured to accommodate the nose of a wearer. Furthermore, the lower edge of the frame 904 can also be shaped to substantially conform to the wearer's facial profile, thus allowing some embodiments to be closely fitted to the wearer's head while not contacting the skin of the wearer's face and other embodiments to contact the wearer's face at multiple points to create an enclosure. The eyewear 900 can include a strap 906 that can be configured to substantially secure the eyewear 900 in a fixed location relative to the wearer's face and/or create an effective seal against the wearer's face to impede or prevent the entrance of water, snow, dirt, or other particulates into the enclosed area.

The lens 902 of eyewear 900 can include the lens body 908 and the removable laminate 910. The laminate 910 can be removed by a user, retailer, optical technician, manufacturer, or the like by pulling or peeling the laminate from the surface of the lens body 908. The removable laminate 910 can provide the ability to change laminates 910 such that a user can alter the appearance and/or functionality of eyewear 900 through the attachment, removal, or changing of the removable laminate 910.

The eyewear 900 can impart functionality to the lens 902 through the attachment of the removable laminate 910. As an example, the lens 902 can include lens body 908 having a hydrophobic coating. The lens 902 can have anti-reflective functionality added to the lens 902 through the attachment of the removable laminate 910 having an interference stack disposed on a malleable substrate. Thus, the eyewear 900 can have a hydrophobic coating and an anti-reflective coating incorporated into the lens 902 without significantly degrading the performance of either. As another example, the laminate 910 can include a flash mirror coating deposited on a suitable substrate, such as BoPET. The lens body 908 can include a hard coat and a hydrophobic layer. The removable laminate 910 can be removably attached to the lens body 908 such that the combination provides the eyewear 900 with a flash mirror exterior surface and a hydrophobic interior surface. Such functionality can be desirable for aesthetic reasons, reducing or eliminating condensation on the interior side of goggles, reducing glare or light intensity during outdoor activities, another purpose, or any combination of purposes.

The lens body 908 can include a substrate and one or more layers providing functionality to the lens 902. The lens body 908 can have a substrate layer including polycarbonate, CR-39®, doped glass, filter glass, clear glass, nylon, polyurethane, polyethylene, polyimide, PET, MYLAR®, acrylic, a polymeric material, a co-polymer, a doped material, any other suitable material, or any combination of materials. The lens body 908 can be coated with one or more functional coatings, including, for example, a hard coat, anti-fog coating, anti-reflective coating, anti-static coating, index matching layers, adhesives, flash mirror coating, interference stack, hydrophobic coating, polarizing film, photochromic layer(s), electrochromic layer(s), liquid containing layer(s), chroma enhancement filters, color enhancement filters, contrast enhancement filters, trichoic filters, glass layers, hybrid glass-plastic layers, or any combination of these.

The laminate 910 can include a substrate and one or more layers providing functionality to the lens 902. The laminate 910 can have a substrate layer including polycarbonate, CR-39®, nylon, polyurethane, polyethylene, polyimide, PET, MYLAR®, acrylic, a polymeric material, a co-polymer, a doped material, any other suitable material, or any combination of materials. The laminate 910 can be coated with one or more functional coatings, including, for example, a hard coat, anti-fog coating, anti-reflective coating, anti-static coating, index matching layers, adhesives, flash mirror coating, interference stack, hydrophobic coating, polarizing film, photochromic layer(s), electrochromic layer(s), liquid containing layer(s), chroma enhancement filters, color enhancement filters, contrast enhancement filters, trichoic filters, glass layers, hybrid glass-plastic layers, or any combination of these.

The lens body 908 and laminate 910 can be removably attached using a transition layer 912. The transition layer 912 can include one or more elements or sub-layers configured to achieve the desired bond strength between the lens body 908 and the laminate 910. For example, the transition layer 912 can include functional layers, adhesive layers, coatings, films, laminates, or any combination of these. The transition layer 912 can be disposed on one side of the laminate 910, disposed on the convex surface of the lens body 908, or disposed on the concave surface of the lens body 908. In some embodiments, the transition layer 912 is configured to removably attach the lens body 908 to the laminate 910 through the use of electrostatic adhesion.

In some embodiments, the eyewear 900 includes two lenses 902 similar to the eyewear 100 depicted in FIGS. 1-4. In such a configuration, removable laminates 910 can be applied to lens bodies 908 corresponding to the two lenses 902. The removable laminates 910 can be applied to the convex surface of the lens bodies 908, the concave surface, or both. In this manner, the removable laminates 910 and the lens bodies 908 can impart desirable functionality to the eyewear 900. For example, the lens bodies 908 can be treated with an anti-static coating to reduce or eliminate items such as lint, hair, and/or dust from sticking to the concave side of the lenses 902. The removable laminates 910 can include a pliable substrate, such as acrylic, and can have a photochromic layer disposed on one side of the pliable substrate. The removable laminates 910 can be attached to the convex surface of the lens bodies 908 through the use of transition layer 912 that removably bonds the laminates 910 to the lens bodies 908. Thus, eyewear 900 can have an anti-static coating and a photochromic functional layer wherein the application of one functional element does not significantly degrade the performance of the other.

Figure 10A:
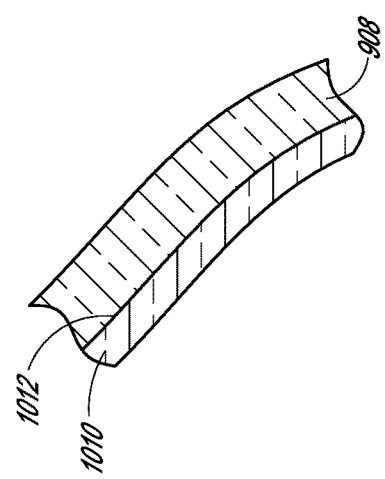
FIGS. 10 and 10A show a perspective view of some embodiments of a pair of goggles having a laminate that is substantially permanently affixed to the convex surface of a lens body.
Figure 10:
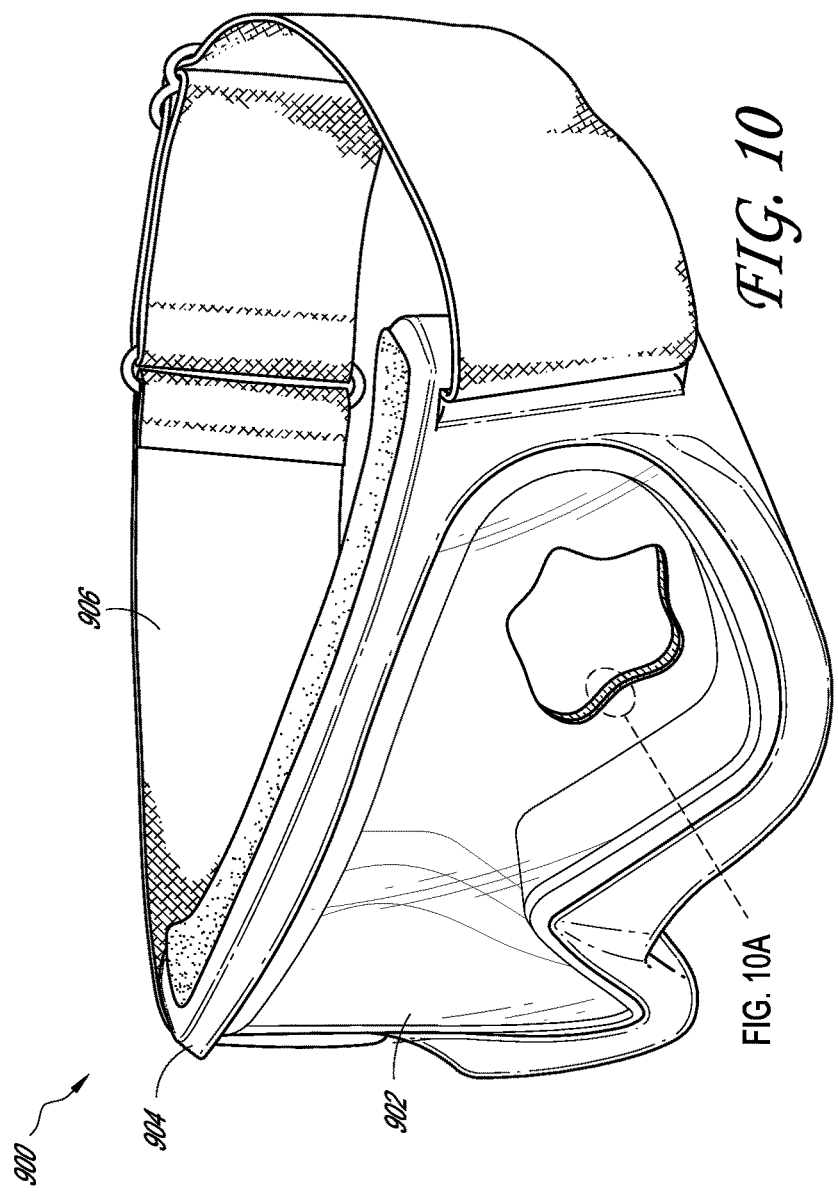

FIGS. 10 and 10A show a perspective view of some embodiments of eyewear 900 having a laminate 1010 substantially permanently attached to a lens body 908. The laminate 1010 is similar to the laminate 910 described in reference to FIG. 9 except that it is not configured to be removable after application. The laminate 1010 can be affixed to the lens body 908 using an adhesive, adhesion material, or adhesion method that substantially permanently bonds the laminate 1010 to the lens body. As illustrated, the laminate 1010 attaches to the convex surface of the lens body 908. In some embodiments, the laminate 1010 attaches to the concave surface of the lens body 908. In some embodiments, the lens body 908 has laminates attached to its concave and convex sides.

Example Method of Manufacturing Lens with Laminate

Figure 11:
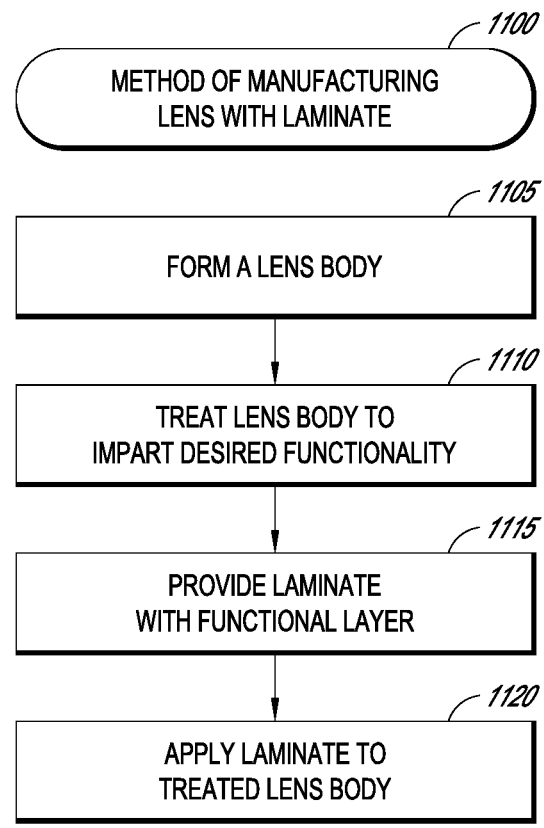
FIG. 11 shows a flow chart of some embodiments of a method for manufacturing a lens including a lens body and a laminate.

FIG. 11 shows a flow chart of some embodiments of a method 1100 for manufacturing a lens including a lens body and a laminate. The lens body and laminate can be configured to impart desired functionality to the lens, as described herein above. Forming the lens in this manner can increase the effectiveness of functional aspects of the lens and reduce costs associated with the manufacture of the lens. For example, it may be desirable to have a lens having a flash mirror coating on a concave or exterior surface of the lens and a hydrophobic coating on the concave or interior surface of the lens. As described more fully herein above, the application of one coating may degrade the performance of the other, reducing the effectiveness of the functional aspects in the lens. Furthermore, methods of manufacturing lenses having both desirable functional qualities may require more involved processes to preserve or restore the functionality of one or more layers. Thus, manufacturing the lens as described herein can reduce costs associated with imparting a lens with one or more functional qualities. The method of manufacture 1100 can be used with a removable laminate attached to the lens body or a laminate that is substantially permanently bonded to the lens body.

In block 1105, the lens body is formed. The lens body can be injection molded, although other processes can be used to form the shape of the lens blank body, such as thermoforming, casting, or machining. In some embodiments, the lens body is injection molded and includes a relatively rigid and optically acceptable material such as polycarbonate. Other materials can be used as a substrate for the lens body including, for example, nylon, polyurethane, polyethylene, polyimide, PET, acrylic, BoPET, glass, or any combination of these. The shape of the lens body would thus be incorporated into a molded lens blank. A lens blank can include the desired curvature and taper in its as-molded condition. One or two or more lens bodies of the desired shape may then be cut from the optically appropriate portion of the lens blank as is understood in the art. In some embodiments, the lens body can be stamped or cut from flat sheet stock and then shaped into the desired configuration using a process such as thermoforming.

In block 1110, the lens body is treated to impart a desired functionality to the lens. In some embodiments, the lens body is treated through an immersion process which generally includes the steps of dipping the lens body in a coating solution, forming a wet layer on the lens body by withdrawing it from the solution, and allowing the coating to attach to the lens body through electrostatic attraction and/or chemical reaction. For example, a lens can be coated with a hydrophobic material by immersing it in a hydrophobic solution for a defined amount of time under controlled temperature conditions. The coating quality can be controlled at least in part by the immersion time, temperature, and/or solution content. After application of the hydrophobic coating using the immersion process in this manner, the entire lens may be coated with a hydrophobic material. Other processes could be used to coat the lens including, for example, dip coating, spray coating, flow coating, spin coating, capillary coating, roll coating, chemical coating, printing technique, drying and curing techniques, vacuum deposition, other coating techniques, or any combination of coating techniques. As another example, the lens body can receive a hard coat through spin coating, dip coating, spray coating or similar coating technique.

In some embodiments, the lens body is treated through a vapor deposition technique which generally includes placing the lens body in a low-pressure or near vacuum container, vaporizing source material in a carrier gas, transporting the material to the lens, and depositing the material on the lens body. For example, a pulsed Argon plasma can be used to evaporate a target material (e.g., the material to be deposited on the lens) and provide a pre-cleaning of the lens. The evaporated material can be transported to and deposited on the lens. This process can be repeated for each film layer to be deposited on a lens body. For example, an interference stack can be deposited on the lens through a physical vapor deposition process. Other processes could be used, including chemical vapor deposition, directed vapor deposition, vapor deposition using magnetron sputtering, vapor deposition using plasma polymerization, another deposition technique, or any combination of deposition techniques.

In some embodiments, the lens body is treated by applying functional layers to the substrate layer. For example, an optical filter can be incorporated into the lens body. A functional layer or film that includes an optical filter including one or more chroma enhancing dyes can be included in a mold, such as an injection mold, so that the film with the optical filter is integrally molded as part of the lens body. Furthermore, one or more additional elements such as photochromic, polarizing, abrasion-resistant, or tinting elements can be incorporated into the functional layer or film and integrally molded as part of the lens body. The elements can be made by many convenient manufacturing processes, including but not limited to lamination of the layers, adhesive securement of the individual layers, and extrusion of one or more layers to form the functional layer or film. In some embodiments, a method of making the functional film includes extruding layers in sequence or at the same time in the appropriate order of layers. In some embodiments, the lens body includes a functional film having a protective polymeric layer and a dry film adhesive or liquid adhesive between the lens body and the polymeric layer.

In some embodiments, the lens body is treated by dyeing one or more lens elements. Any suitable dyeing process can be used. For example, one or more dyes can be dissolved into a solvent to produce a dyeing solution. The one or more dyes can include one or more chroma enhancement dyes. The one or more dyes can be applied to the lens body or a combination of lens elements. For example, the dyes can be applied to the lens body or other lens element by dipping the element in a dyeing solution, spraying a dyeing solution on the element, or placing the element in a dyeing chamber and directing the one or more dyes into the chamber.

In some embodiments, the lens body is treated by injection molding a lens blank to a polarizer. For example, the polarizer can be combined with the injection molded lens body by positioning the polarizer into a mold and injecting thermoplastic resin into the mold. The polarizer can be, for example, a polarizing wafer as described herein. The polarizing wafer can include one or more insulating polymeric layers configured to insulate a functional base layer from high molding temperatures. Other functional lens elements, such as, for example, at least a portion of a chroma enhancing optical filter, a photochromic material, an interference stack, an anti-static material, a hydrophobic material, an anti-fog layer, a coating, an anti-scratch layer, another functional element, or a combination of elements can be incorporated into a lens with an injection-molded portion in a similar fashion.

Many different functional elements can be incorporated into the lens body using deposition techniques, coating techniques, laminating processes, molding processes, or dyeing techniques as described above. For example, functional elements such as films, layers, or coatings can include an interference stack, a flash mirror coating, photochromic layer(s), electrochromic layer(s), anti-static coating, chroma enhancement dyes, hard coat, color enhancement elements, contrast enhancement elements, trichoic filters, glass layers, hybrid glass-plastic layers, anti-reflective coating, hard coats, index matching layers, or any combination of these.

In block 1115, a laminate having a functional layer is provided. Providing the laminate can include manufacturing the laminate, procuring the laminate through a supplier, or obtaining the laminate through some other means. The laminate can be formed using any suitable technique, such as those described herein above related to the forming of the lens body. The laminate includes a substrate which can be pliable in some embodiments. The substrate can include, for example, polycarbonate, nylon, polyurethane, polyethylene, polyimide, PET, acrylic, BoPET, glass, or any combination of these. The laminate can include one or more coatings, films, or layers having functional properties. For example, the laminate can be coated with an anti-reflective coating using a vapor deposition technique. As another example, the laminate can include a flash mirror coating deposited on the laminate substrate using a vacuum coating machine. Other functional elements can be included using techniques described herein including, for example, coating techniques, vapor deposition techniques, laminating techniques, dyeing techniques, or any combination of these. The laminate can include functional elements such as, for example, an interference stack, a flash mirror, photochromic layer(s), anti-reflective coating, anti-static coating, liquid containing layer(s), electrochromic layer(s), chroma enhancement filters, color enhancement filters, contrast enhancement filters, trichoic filters, glass layers, hybrid glass-plastic layers, hard coats, index matching layers, or any combination of these.

In some embodiments, the laminate can be configured to the size and pattern the laminate will have when included in the lens. This can be accomplished using any suitable technique. In certain embodiments, the laminate can be pre-shaped before being applied to the lens. In some embodiments, the laminate can be shaped while being applied to the lens. The laminate can be pre-shaped using any suitable laminate shaping process. In some embodiments, a suitable process entails thermoforming. In some embodiments, a suitable process entails heating the laminate to a suitable temperature and simultaneous with or subsequent to the heating, applying positive pressure to the laminate using a suitable device to shape the laminate and match the shape of the surface of the lens body. Once the laminate is appropriately shaped, the process finishes by cooling the laminate to room temperature and releasing the positive pressure.

In block 1120, the laminate is applied to the treated lens body. In some embodiments, the laminate is applied to the treated lens body by overlaying the laminate on the lens body to create the desired functional lens. For example, the laminate can be configured to be applied to the convex or exterior surface of the lens body to provide the lens with an anti-reflective coating on the exterior surface of the lens. As another example, the laminate can be configured to be applied to the concave or interior surface of the lens body to provide a hydrophobic coating to the interior side of the lens. Application of the laminate can include, for example, positioning the laminate on the lens body, orienting the laminate relative to the lens body, orienting the laminate such that the desired side of the laminate is in contact with the lens body, or any combination of these. Application of the laminate can include preparing the laminate for bonding with the lens body, preparing the lens body for bonding with the laminate, and other pre-bonding processes to increase the effectiveness of the bonding between the laminate and the lens body such as applying an adhesive layer to the appropriate surface of the laminate, the lens body, or both.

Applying the laminate can also include bonding it to the lens body. In some embodiments, the lens body and the laminate can be bonded together to make the lens using a technique such as, for example, laminate bonding, thermoforming, injection molding, compression molding, or injection-compression molding (e.g., coining). In some embodiments, the laminate can be attached to any surface of the lens body using any suitable technique, such as adhesive attachment or laminate bonding.

In some embodiments, bonding the laminate and the lens body includes applying an adhesion layer that can include an adhesive that is thermally or UV-cured, a pressure sensitive adhesive, or some other substance that facilitates or improves electrostatic adhesion. Methods and materials suitable for bonding the lens body to the laminate can be used to facilitate adhesion between two or more lens elements. Examples of bonding technologies that may be suitable include thermal welding, fusing, pressure sensitive adhesives, polyurethane adhesives, electrostatic attraction, thermoforming, other types of adhesives, materials curable by ultraviolet light, thermally curable materials, radiation-curable materials, other bonding methods, other bonding materials, and combinations of methods and/or materials. In some embodiments, a pressure sensitive adhesive can be used in the adhesion layer and can be rolled, sprayed, or otherwise applied to a surface so that it is disposed between the lens body and the laminate. Materials suitable for use as the adhesion layer can be selected to have good optical properties, including high optical transparencies, no yellowing upon exposure to sunlight, an ability to flex during injection molding without becoming crazed, minimal shrinkage during curing, and the like. The materials used for the adhesion layer can be curable by thermal treatment or by treatment with ultraviolet light. In some embodiments, the adhesion layers can be used to index match materials in the lens. In some embodiments, the laminate and the lens body are substantially permanently bonded together. In some embodiments, the laminate is removably bonded to the lens body.

The method 1100 provides a lens incorporating functional properties such as optical filters, mirror elements, anti-fog layers, light polarizers, flash mirrors, interference stacks, anti-static coatings, electrochromic layers, and photochromic layers. The method 110 can also provide for functional elements in laminates to be incorporated into existing lenses that, as originally manufactured, lack such properties. For example, desirable properties such as chroma enhancement can be imparted to existing lenses, instead of discarding the existing lenses and manufacturing new lenses that include the desirable properties. In some embodiments, a suitable solvent can be applied to remove the laminate from the existing lens so that a laminate with different characteristics can be applied to the existing lens. In certain embodiments, the laminate can be removed by application of heat or separation force.

Example Method of Using Removable Laminate with Eyewear

Figure 12:
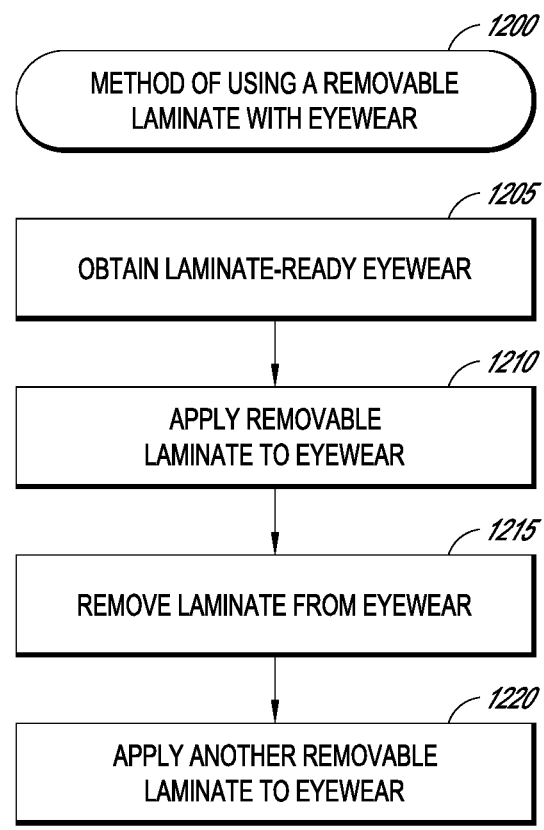
FIG. 12 shows a flow chart of some embodiments of a method for using a removable laminate with eyewear.

FIG. 12 shows a flow chart of some embodiments of a method 1200 for using a removable laminate with eyewear. The removable laminate can be applied and removed by a user, retailer, optical technician, manufacturer, or the like to add, remove, or alter functional aspects of the eyewear. In some embodiments, removable laminates can be obtained which are compatible with and relatively easily attached to a particular eyewear. Thus, a user of the eyewear can change aspects of the eyewear through a relatively easy and quick process.

In block 1205, a laminate-ready eyewear is obtained. Laminate-ready eyewear can include eyewear having a lens body with a thickness profile designed such that when a laminate is attached thereto, the final lens has a desired lens profile. The surface of the lens body or other lens element can be treated in preparation for attaching a laminate. For example, treatments can include corona treatment, UV ozone treatment, atmospheric plasma processing (any type), vacuum plasma processing, heating, moisture exposure, solvent exposure, another treatment method, or any combination of methods.

In block 1210, a removable laminate is applied to the eyewear. The removable laminate can include a pliable or flexible substrate including BoPET, acrylic, polycarbonate, polyethylene, polyurethane, nylon, polyimide, PET, or any combination of these. The removable laminate can be pliable so that it can substantially conform to the contour of the lens element to which it is attached. For example, if a lens body has a cylindrical shape, the removable laminate can be applied to the lens body and substantially conform to the cylindrical shape. In some embodiments, the laminate is approximately the same size as the lens element to which it is attached. In some embodiments, the laminate is larger than the lens element to which it is attached and can be modified to be of the approximate same size. For example, the laminate can be cut, bent, or folded such that it becomes of a similar size to the lens body. In some embodiments, the laminate can be smaller than the lens element to which it is attached. For example, the laminate can be positioned over a portion of the lens element for which it is desirable to incorporate the functionality of the laminate. In some embodiments, laminates can be attached to more than one side of a lens element. In some embodiments, multiple laminates can be placed on a single side of a lens element where the laminates overlap or are spatially separate.

The laminate can be selected based on the functionality it provides for eyewear. For example, the laminate can include an anti-reflective functional layer disposed on the pliable substrate. Applying the laminate to the eyewear then would impart an anti-reflective capability to the eyewear. As another example, the laminate can include an anti-fog or hydrophobic layer which can be attached to the interior side of a lens of the eyewear. The laminate can include one or more functional layers, films, or coatings to impart one or more than one functional qualities to the eyewear. For example, the laminate can provide an anti-reflective coating, an anti-static coating, photochromic layer(s), electrochromic layer(s), polarizing elements, hard coats, index matching layers, an interference stack, a flash mirror coating, anti-scratch coating, chroma enhancement filters, color enhancement filters, contrast enhancement filters, trichoic filters, glass layers, hybrid glass-plastic layers, or any combination of these.

Applying the laminate can include placing the laminate on a lens element and applying suitable pressure such that the laminate attaches to the lens element through a suitable adhesive method. For example, the laminate and lens element can be attached through electrostatic adhesion, a pressure sensitive adhesive, another adhesive, or any combination of adhesives which allow for the removal of the laminate. The surface of the lens body or other lens element can be treated in preparation for applying the laminate. Surface treatments can include, for example, corona treatment, UV ozone treatment, atmospheric plasma processing, vacuum plasma processing, heating, moisture exposure, solvent exposure, another treatment method, or any combination of methods. Applying the laminate can include the use of calender rollers to apply it to a lens body or other lens element, applying the laminate under a vacuum, and/or applying the laminate under pressure.

In block 1215, the laminate is removed from the eyewear. The laminate can be configured to be removable by a user by applying a pulling force to the laminate. The adhesion between the laminate and the lens element to which it is attached can be such that applying a force by a person can be sufficient to remove the laminate from the eyewear. For example, the laminate can be attached to a lens body through the use of electrostatic adhesion. By overcoming the electrostatic force maintaining the laminate joined to the lens body, a user can peel the laminate from the eyewear. In some embodiments, the frame or other component of the eyewear contains a mechanism that aids in the removal of the laminate. For example, a roller or slider can be built into the frame that aids a user in pulling the laminate off of the lens body. In some embodiments, the eyewear contains a storage compartment that holds one or more laminates prior to application and/or after removal.

In some embodiments, removing the laminate can cause a color change or similar optical property of the lens. This can be useful for applications where differing chroma, color, or contrast characteristics are desirable, for example, in sporting activities with different lighting requirements.

In some embodiments, multiple duplicate laminates can be included with a lens. The topmost laminate can be removed when it becomes dirty, scratched, torn, damaged, or otherwise becomes undesirable to the user. In this way, the user can refresh the eyewear, restoring the lenses of the eyewear to a substantially new and/or substantially undamaged condition. For example, goggles used during bicycle, motorcycle, or other vehicular racing in may become dirty and/or partially obscure the vision of the user. Users can wear goggles that incorporate multiple duplicate laminates. An example scenario of the use of eyewear incorporating multiple duplicate laminates will now be described. During a race or other competitive event in which participants and their eyewear may be exposed to harsh and/or dirty conditions, a participant can remove the topmost laminate when it becomes sufficiently dirty or damaged such that the user's vision is impaired or obstructed. In this way, the user can remove the laminate thereby restoring the goggle to a clean condition and providing an advantage over other racers who have dirty or damaged eyewear.

In block 1220, another removable laminate is applied to the eyewear. Applying another laminate to the eyewear can include the same process as described above. The other laminate can be chosen to provide desired functionality that may not have been present in the prior laminate or to replace a laminate that may have been damaged. In some embodiments, the other laminate can be applied over the first laminate such that the first laminate need not be removed prior to the application of the subsequent laminate. In this way, multiple functions can be imparted to the eyewear to achieve a desired result. For example, an anti-fog coating can be applied to the eyewear as well as a photochromic layer.

CONCLUSION

It is contemplated that the particular features, structures, or characteristics of any embodiments discussed herein can be combined in any suitable manner in one or more separate embodiments not expressly illustrated or described. For example, it is understood that an optical filter can include any suitable combination of light attenuation features and that a combination of light-attenuating lens elements can combine to control the chroma of an image viewed through a lens. In many cases, structures that are described or illustrated as unitary or contiguous can be separated while still performing the function(s) of the unitary structure. In many instances, structures that are described or illustrated as separate can be joined or combined while still performing the function(s) of the separated structures. It is further understood that the optical filters disclosed herein can be used in at least some lens configurations and/or optical systems besides lenses.

It should be appreciated that in the above description of embodiments, various features are sometimes grouped together in a single embodiment, figure, or description thereof for the purpose of streamlining the disclosure and The following is claimed:

1. A lens, wherein the lens comprises a laminated structure comprising:
   a rigid substrate layer with a convex surface and a concave surface;
   a flexible substrate layer disposed on the concave surface of the rigid substrate layer and comprising an anti-fog layer configured to resist accumulation of condensate; and
   a hard coat layer interposed between the rigid substrate layer and the flexible substrate layer.

2. The lens of claim 1, further comprising an adhesive layer interposed between the hard coat layer and the flexible substrate layer.

3. The lens of claim 2, wherein the rigid substrate layer comprises a polycarbonate material.

4. The lens of claim 3, wherein the flexible substrate layer is configured to conform to the concave surface of the rigid substrate layer and is proximal to a wearer's eye when the lens is fitted to a frame worn by the wearer.

5. The lens of claim 4, wherein the flexible substrate layer comprises a single lens element.

6. The lens of claim 1, further comprising:
   another hard coat layer on the convex surface of the rigid substrate layer; and
   a laminate disposed on the other hard coat layer and comprising a functional layer.

7. The lens of claim 6, wherein the functional layer comprises an anti-fog layer.

8. A lens, comprising:
   a lens body comprising a substrate layer with a first surface and a second surface opposite to the first surface;
   a first hard coat layer on the first surface of the substrate layer;
   a second hard coat layer on the second surface of the substrate layer; and
   a lens element laminated to the lens body via the second hard coat layer, wherein the lens element has anti-fog functionality configured to resist accumulation of condensate.

9. The lens of claim 8, wherein the lens element is a removable laminate attached to the second hard coat layer via a thermally cured adhesive layer or an ultra-violet (UV)-cured adhesive layer.

10. The lens of claim 8, wherein the substrate layer comprises a rigid polycarbonate material.

11. The lens of claim 10, wherein the lens element comprises a substantially flexible substrate configured to conform to the second surface of the substrate layer.

12. The lens of claim 11, wherein the first surface is a convex surface and the second surface is a concave surface.

13. A lens, comprising:
   a substantially rigid substrate with a first surface and a second surface opposite to the first surface, wherein the substantially rigid substrate comprises a first hard coat layer forming the first surface and a second hard coat layer forming the second surface;
   a substantially flexible lens element attached to the first surface of the substantially rigid substrate, wherein the substantially flexible lens element is configured to conform to the first surface of the substantially rigid substrate and comprises an anti-fog layer.

14. The lens of claim 13, wherein the substantially rigid substrate comprises a polycarbonate material, the first surface is a concave surface, and the second surface is a convex surface.

15. The lens of claim 14, wherein the substantially flexible lens element is attached to the substantially rigid substrate via a thermally cured adhesive layer, an ultra-violet (UV)-cured adhesive layer, a pressure sensitive adhesive layer, or an electrostatic adhesive layer.

16. The lens of claim 15, wherein the substantially flexible lens element is a laminate proximal to a wearer's eye when the lens is fitted to a frame worn by the wearer.

17. The lens of claim 15, wherein the substantially flexible lens element comprises a polymeric material.

18. The lens of claim 13, wherein the substantially flexible lens element is removable.

19. The lens of claim 13, wherein the substantially rigid substrate comprises polycarbonate, nylon, polyurethane, polyethylene, polyimide, PET, acrylic, MYLAR®, clear glass, doped glass, or filtered glass.

20. The lens of claim 13, wherein the anti-fog layer is proximal to a wearer's eye when the lens is fitted to a frame worn by the wearer.

* * * * *

UNITED STATES PATENT AND TRADEMARK OFFICE
CERTIFICATE OF CORRECTION

| | |
|---|---|
| PATENT NO. | : 11,579,470 B2 |
| APPLICATION NO. | : 16/896016 |
| DATED | : February 14, 2023 |
| INVENTOR(S) | : Saylor et al. |

Page 1 of 1

It is certified that error appears in the above-identified patent and that said Letters Patent is hereby corrected as shown below:

In the Specification

In Column 15, Line 32, delete "an" and insert -- a --, therefor.

In Column 18, Line 24, delete "perfluoroalkysilane," and insert -- perfluoroalkylsilane, --, therefor.

In Column 19, Line 19, delete "poly(theylene" and insert -- poly(ethylene --, therefor.

In Column 21, Line 57, delete "510" and insert -- 520 --, therefor.

In Column 34, Line 29, delete "110" and insert -- 1100 --, therefor.

Signed and Sealed this
Thirtieth Day of September, 2025

John A. Squires
*Director of the United States Patent and Trademark Office*